United States Patent
Gardner

(10) Patent No.: US 8,315,444 B2
(45) Date of Patent: Nov. 20, 2012

(54) UNITIZED ERGONOMIC TWO-DIMENSIONAL FINGERPRINT MOTION TRACKING DEVICE AND METHOD

(75) Inventor: Lawrence C. Gardner, San Jose, CA (US)

(73) Assignee: Validity Sensors, Inc., San Jose, CA (US)

( * ) Notice: Subject to any disclaimer, the term of this patent is extended or adjusted under 35 U.S.C. 154(b) by 0 days.

(21) Appl. No.: 13/460,330

(22) Filed: Apr. 30, 2012

(65) Prior Publication Data

US 2012/0206586 A1 Aug. 16, 2012

Related U.S. Application Data

(63) Continuation of application No. 12/103,655, filed on Apr. 15, 2008, now Pat. No. 8,175,345.

(51) Int. Cl.
*G06K 9/00* (2006.01)
(52) U.S. Cl. .......................... 382/124; 382/103; 382/218
(58) Field of Classification Search ........................ None
See application file for complete search history.

(56) References Cited

U.S. PATENT DOCUMENTS

| | | | |
|---|---|---|---|
| 4,151,512 A | 4/1979 | Riganati et al. |
| 4,225,850 A | 9/1980 | Chang et al. |
| 4,310,827 A | 1/1982 | Asi |
| 4,353,056 A | 10/1982 | Tsikos |
| 4,405,829 A | 9/1983 | Rivest et al. |
| 4,525,859 A | 6/1985 | Bowles et al. |
| 4,550,221 A | 10/1985 | Mabusth |
| 4,580,790 A | 4/1986 | Doose |
| 4,758,622 A | 7/1988 | Gosselin |
| 4,817,183 A | 3/1989 | Sparrow |
| 5,076,566 A | 12/1991 | Kriegel |
| 5,109,427 A | 4/1992 | Yang |
| 5,140,642 A | 8/1992 | Hau et al. |

(Continued)

FOREIGN PATENT DOCUMENTS

DE 2213813 A1 10/1973

(Continued)

OTHER PUBLICATIONS

Matsumoto et al., Impact of Artificial "Gummy" Fingers on Fingerprint Systems, SPIE 4677 (2002), reprinted from cryptome.org.

(Continued)

*Primary Examiner* — Manav Seth
(74) *Attorney, Agent, or Firm* — Greenberg Traurig LLP; Cecily Anne O'Regan; William C. Cray

(57) ABSTRACT

A sensor which uses a plurality of partial fingerprint readers (imagers), and various computational algorithms, to detect changes in fingerprint images as a function of finger movement. The sensor can provide both finger motion information and fingerprint images. The sensor uses multiple partial fingerprint readers, arranged in different directions on a surface, to detect finger motion in two dimensions. The sensor can also detect the relative speed and direction of finger movement. Some sensor embodiments use deep finger penetrating radio frequency (RF) based circuits, which can be inexpensively printed or formed on the surface of robust and flexible dielectric materials such as Kapton tape. The sensor also has textured surfaces to help guide the user. The sensor both small and robust, and is well suited for control applications for low-cost mass market microprocessor controlled devices such as cell phones, MP3 players, laptop computers, and other devices.

36 Claims, 18 Drawing Sheets

U.S. PATENT DOCUMENTS

| | | | |
|---|---|---|---|
| 5,305,017 A | 4/1994 | Gerpheide |
| 5,319,323 A | 6/1994 | Fong |
| 5,325,442 A | 6/1994 | Knapp |
| 5,420,936 A | 5/1995 | Fitzpatrick et al. |
| 5,422,807 A | 6/1995 | Mitra et al. |
| 5,429,006 A * | 7/1995 | Tamori ................... 73/862.046 |
| 5,456,256 A | 10/1995 | Schneider et al. |
| 5,543,591 A | 8/1996 | Gillespie et al. |
| 5,569,901 A | 10/1996 | Bridgelall et al. |
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,838,306 A | 11/1998 | O'Connor et al. |
| 5,848,176 A | 12/1998 | Harra et al. |
| 5,850,450 A | 12/1998 | Schweitzer et al. |
| 5,852,670 A | 12/1998 | Setlak et al. |
| 5,864,296 A * | 1/1999 | Upton ........................... 340/5.53 |
| 5,887,343 A | 3/1999 | Salatino et al. |
| 5,892,824 A | 4/1999 | Beatson et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A | 8/1999 | Setlak et al. |
| 5,999,637 A | 12/1999 | Toyoda et al. |
| 6,002,815 A | 12/1999 | Immega et al. |
| 6,011,859 A * | 1/2000 | Kalnitsky et al. ............. 382/124 |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,118,318 A | 9/2000 | Fifield et al. |
| 6,134,340 A | 10/2000 | Hsu et al. |
| 6,157,722 A | 12/2000 | Lerner et al. |
| 6,161,213 A | 12/2000 | Lofstrom |
| 6,175,407 B1 | 1/2001 | Santor |
| 6,182,076 B1 | 1/2001 | Yu et al. |
| 6,182,892 B1 | 2/2001 | Angelo et al. |
| 6,185,318 B1 | 2/2001 | Jain et al. |
| 6,234,031 B1 | 5/2001 | Suga |
| 6,241,288 B1 | 6/2001 | Bergenek et al. |
| 6,259,108 B1 | 7/2001 | Antonelli et al. |
| 6,289,114 B1 | 9/2001 | Mainguet |
| 6,317,508 B1 | 11/2001 | Kramer et al. |
| 6,320,394 B1 | 11/2001 | Tartagni |
| 6,332,193 B1 | 12/2001 | Glass et al. |
| 6,333,989 B1 | 12/2001 | Borza |
| 6,337,919 B1 | 1/2002 | Duton |
| 6,346,739 B1 | 2/2002 | Lepert et al. |
| 6,347,040 B1 | 2/2002 | Fries et al. |
| 6,360,004 B1 | 3/2002 | Akizuki |
| 6,362,633 B1 | 3/2002 | Tartagni |
| 6,392,636 B1 | 5/2002 | Ferrari et al. |
| 6,399,994 B2 | 6/2002 | Shobu |
| 6,400,836 B2 | 6/2002 | Senior |
| 6,408,087 B1 | 6/2002 | Kramer |
| 6,473,072 B1 | 10/2002 | Comiskey et al. |
| 6,509,501 B2 | 1/2003 | Eicken et al. |
| 6,539,101 B1 | 3/2003 | Black |
| 6,580,816 B2 | 6/2003 | Kramer et al. |
| 6,597,289 B2 | 7/2003 | Sabatini |
| 6,643,389 B1 | 11/2003 | Raynal et al. |
| 6,672,174 B2 | 1/2004 | Deconde et al. |
| 6,710,416 B1 | 3/2004 | Xu |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,838,905 B1 | 1/2005 | Doyle |
| 6,886,104 B1 | 4/2005 | McClurg et al. |
| 6,897,002 B2 | 5/2005 | Teraoka et al. |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,013,030 B2 | 3/2006 | Wong et al. |
| 7,020,591 B1 | 3/2006 | Wei et al. |
| 7,030,860 B1 | 4/2006 | Hsu et al. |
| 7,035,443 B2 | 4/2006 | Wong |
| 7,042,535 B2 | 5/2006 | Katoh et al. |
| 7,043,061 B2 | 5/2006 | Hamid et al. |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 | 8/2006 | Benkley |
| 7,110,577 B1 | 9/2006 | Tschud |
| 7,113,622 B2 | 9/2006 | Hamid |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,190,816 B2 | 3/2007 | Mitsuyu et al. |
| 7,194,392 B2 | 3/2007 | Tuken et al. |
| 7,197,168 B2 | 3/2007 | Russo |
| 7,200,250 B2 | 4/2007 | Chou |
| 7,251,351 B2 | 7/2007 | Mathiassen et al. |
| 7,258,279 B2 | 8/2007 | Schneider et al. |
| 7,260,246 B2 | 8/2007 | Fujii |
| 7,263,212 B2 | 8/2007 | Kawabe |
| 7,263,213 B2 | 8/2007 | Rowe |
| 7,289,649 B1 | 10/2007 | Walley et al. |
| 7,290,323 B2 | 11/2007 | Deconde et al. |
| 7,308,121 B2 | 12/2007 | Mathiassen et al. |
| 7,308,122 B2 | 12/2007 | McClurg et al. |
| 7,321,672 B2 | 1/2008 | Sasaki et al. |
| 7,356,169 B2 | 4/2008 | Hamid |
| 7,360,688 B1 | 4/2008 | Harris |
| 7,369,685 B2 | 5/2008 | DeLeon |
| 7,379,569 B2 | 5/2008 | Chikazawa et al. |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart et al. |
| 7,463,756 B2 | 12/2008 | Benkley |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,751,601 B2 | 7/2010 | Benkley |
| 7,843,438 B2 | 11/2010 | Onoda |
| 7,899,216 B2 | 3/2011 | Watanabe et al. |
| 7,953,258 B2 | 5/2011 | Dean et al. |
| 8,005,276 B2 | 8/2011 | Dean et al. |
| 8,031,916 B2 | 10/2011 | Abiko et al. |
| 8,077,935 B2 | 12/2011 | Geoffroy et al. |
| 8,107,212 B2 | 1/2012 | Nelson et al. |
| 8,116,540 B2 | 2/2012 | Dean et al. |
| 8,131,026 B2 | 3/2012 | Benkley et al. |
| 8,165,355 B2 | 4/2012 | Benkley et al. |
| 2001/0026636 A1 | 10/2001 | Mainget |
| 2001/0030644 A1 | 10/2001 | Allport |
| 2001/0036299 A1 | 11/2001 | Senior |

| | | |
|---|---|---|
| 2001/0043728 A1 | 11/2001 | Kramer et al. |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fuji |
| 2003/0161512 A1 | 8/2003 | Mathiassen |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishii et al. |
| 2005/0136200 A1 | 6/2005 | Durell et al. |
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 | 8/2005 | Howell et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Funushige et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0271793 A1 | 11/2006 | Devadas et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0180261 A1 | 8/2007 | Akkermans et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0248249 A1 | 10/2007 | Stoianov |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0240523 A1 | 10/2008 | Benkley et al. |
| 2008/0244277 A1 | 10/2008 | Orsini et al. |
| 2008/0267462 A1 | 10/2008 | Nelson et al. |
| 2008/0279373 A1 | 11/2008 | Erhart et al. |
| 2009/0130369 A1 | 5/2009 | Huang et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0237135 A1 | 9/2009 | Ramaraju et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0279742 A1 | 11/2009 | Abiko |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0083000 A1 | 4/2010 | Kesanupalli |
| 2010/0119124 A1 | 5/2010 | Satyan |
| 2010/0123657 A1 | 5/2010 | Shimizu |

| | | | |
|---|---|---|---|
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Dean et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0244166 A1 | 9/2010 | Shibuta et al. |
| 2010/0272329 A1 | 10/2010 | Benkley |
| 2010/0284565 A1 | 11/2010 | Benkley et al. |
| 2011/0002461 A1 | 1/2011 | Erhart et al. |
| 2011/0018556 A1 | 1/2011 | Le et al. |
| 2011/0102567 A1 | 5/2011 | Erhart |
| 2011/0102569 A1 | 5/2011 | Erhart |
| 2011/0182486 A1 | 7/2011 | Valfridsson et al. |
| 2011/0214924 A1 | 9/2011 | Perezselsky et al. |
| 2011/0267298 A1 | 11/2011 | Erhart et al. |
| 2011/0298711 A1 | 12/2011 | Dean et al. |
| 2011/0304001 A1 | 12/2011 | Erhart et al. |
| 2012/0044639 A1 | 2/2012 | Garcia |

FOREIGN PATENT DOCUMENTS

| | | |
|---|---|---|
| EP | 0929028 A2 | 1/1998 |
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1939788 A1 | 7/2008 |
| GB | 2331613 A | 5/1999 |
| GB | 2480919 | 12/2011 |
| JP | 04158434 A2 | 6/1992 |
| JP | 2005242856 | 9/2005 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/0104012 A1 | 11/2005 |
| WO | WO 2005/106774 A2 | 11/2005 |
| WO | WO 2005/106774 A3 | 11/2005 |
| WO | WO 2006/040724 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079257 A1 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/053797 A1 | 5/2011 |

OTHER PUBLICATIONS

Maltoni, "Handbook of Fingerprint Recognition", XP002355942 Springer, New York, USA, Jun. 2003 pp. 65-69.

Vermasan, et al., "A 500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] *pp. 127-134, paragraph 6.2*.

Gassend, et al., "Controlled Physical Random Functions", In Proceedings of the 18th Annual Computer Security Conference, Las Vegas, Nevada, Dec. 12, 2002.

Wikipedia (Mar. 2003). "Integrated Circuit," http://en.wikipedia.org/wiki/integrated_circuit. Revision as of Mar. 23, 2003.

Wikipedia (Dec. 2006). "Integrated circuit" Revision as of Dec. 10, 2006. http://en.widipedia.org/wiki/Integrated_circuit.

BELLAGIODESIGNS.COM (Internet Archive Wayback Machine, www.bellagiodesigns.com date: Oct. 29, 2005).

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

Galy et al. (Jul. 2007) "A full fingerprint verification system for a single-line sweep sensor." IEEE Sensors J., vol. 7 No. 7, pp. 1054-1065.

* cited by examiner

UNITIZED ERGONOMIC TWO-DIMENSIONAL FINGERPRINT MOTION TRACKING DEVICE AND METHOD

CROSS-REFERENCE

This application is a continuation of application Ser. No. 12/103,655 filed Apr. 15, 2008 now U.S. Pat. No. 8,175,345, entitled "Unitized Ergonomic Two-Dimensional Fingerprint Motion Tracking Device and Method," by Lawrence C. Gardner, the contents of which are incorporated herein by reference.

BACKGROUND OF THE INVENTION

The invention relates generally to technology for sensing and recording finger motion, fingerprints and, more particularly to systems, devices and methods for finger motion tracking both alone, and in combination with fingerprint image processing and navigation operations.

Partial fingerprint scanners are becoming popular for a wide variety of security applications. In contrast to "all at once" fingerprint scanners, which capture an image of an entire fingerprint at the same time, partial fingerprint sensing devices use a sensing area that is smaller than the fingerprint area to be imaged. By imaging only a portion of a fingerprint at any given time, the size and cost of a partial fingerprint sensor can be made considerably smaller and cheaper than that of a full fingerprint sensor. However to capture a full fingerprint image, the user must move his finger and "swipe" it across the sensing zone of the partial finger print sensor.

Various types of partial fingerprint readers exist. Some work by optical means, some by pressure sensor means, and others by capacitance sensing means or radiofrequency sensing means.

For example, one common configuration used for a fingerprint sensor is a one or two dimensional array of CCD (charge coupled devices) or C-MOS circuit sensor elements (pixels). These components are embedded in a sensing surface to form a matrix of pressure sensing elements that generate signals in response to pressure applied to the surface by a finger. These signals are read by a processor and used to reconstruct the fingerprint of a user and to verify identification.

Other devices include one or two dimensional arrays of optical sensors that read light reflected off of a person's finger and onto an array of optical detectors. The reflected light is converted to a signal that defines the fingerprint of the finger analyzed and is used to reconstruct the fingerprint and to verify identification.

Many types of partial fingerprint scanners are comprised of linear (1 dimensional) arrays of sensing elements (pixels). These one dimensional sensors create a two dimensional image of a fingerprint through the relative motion of the finger pad relative to the sensor array.

One class of partial fingerprint sensors that are particularly useful for small device applications are deep finger penetrating radio frequency (RF) based sensors. These are described in U.S. Pat. Nos. 7,099,496; 7,146,024; and patent application publications US 2005-0244038 A1; US 2005-0244039 A1; US 2006-0083411 A1; US 2007-0031011 A1, and the contents of these patents and patent applications are incorporated herein by reference. These types of sensors are commercially produced by Validity Sensors, Inc, San Jose Calif. This class of sensor mounts the sensing elements (usually arranged in a one dimensional array) on a thin, flexible, and environmentally robust support, and the IC used to drive the sensor in a protected location some distance away from the sensing zone. Such sensors are particularly advantageous in applications where small sensor size and sensor robustness are critical.

The Validity fingerprint sensors measure the intensity of electric fields conducted by finger ridges and valleys, such as deep finger penetrating radio frequency (RF) based sensing technology, and use this information to sense and create the fingerprint image. These devices create sensing elements by creating a linear array composed of many miniature excitation electrodes, spaced at a high density, such as a density of approximately 500 electrodes per inch. The tips of these electrodes are separated from a single sensing electrode by a small sensor gap. The electrodes are electrically excited in a progressive scan pattern and the ridges and valleys of a finger pad alter the electrical properties (usually the capacitive properties) of the excitation electrode-sensing electrode interaction, and this in turn creates a detectable electrical signal. The electrodes and sensors are mounted on thin flexible printed circuit support, and these electrodes and sensors are usually excited and the sensor read by an integrated circuit chip (scanner chip, driver chip, scan IC) designed for this purpose. The end result is to create a one dimensional "image" of the portion of the finger pad immediately over the electrode array and sensor junction.

As the finger surface is moved across the sensor, portions of the fingerprint are sensed and captured by the device's one dimensional scanner, creating an array of one dimensional images indexed by order of data acquisition, and/or alternatively annotated with additional time and/or finger pad location information. Circuitry, such as a computer processor or microprocessor, then creates a full two-dimensional fingerprint image by creating a mosaic of these one dimensional partial fingerprint images.

Often the processor will then compare this recreated two dimensional full fingerprint, usually stored in working memory, with an authorized fingerprint stored in a fingerprint recognition memory, and determine if there is a match or not. Software to fingerprint matching is disclosed in U.S. Pat. Nos. 7,020,591 and 7,194,392 by Wei et. al., and is commercially available from sources such as Cogent systems, Inc., South Pasadena, Calif.

If the scanned fingerprint matches the record of an authorized user, the processor then usually unlocks a secure area or computer system and allows the user access. This enables various types of sensitive areas and information (financial data, security codes, etc.), to be protected from unauthorized users, yet still be easily accessible to authorized users.

The main drawback of partial fingerprint sensors is that in order to obtain a valid fingerprint scan, the user must swipe his or her finger across the sensor surface in a relatively uniform manner. Unfortunately, due to various human factors issues, this usually isn't possible. In the real world, users will not swipe their fingers with a constant speed. Some will swipe more quickly than others, some may swipe at non-uniform speeds, and some may stop partially through a scan, and then resume. In order to account for this type of variation, modern partial fingerprint sensors often incorporate finger position sensors to determine, relative to the fingerprint sensor, how the overall finger position and speed varies during a finger swipe.

One type of finger position indicator, represented by U.S. Pat. No. 7,146,024, and application publications US 2005-0244039A1 and US 2005-0235470A1 (the contents of which are incorporated herein by reference) detects relative finger position using a long array of electrical drive plate sensors. These plates sense the bulk of a finger (rather than the fine details of the fingerprint ridges), and thus sense the relative position of the finger relative to the linear array used for fingerprint sensing. A second type of fingerprint position indicator, represented by US patent application publication US 2007-0031011 A1 (the contents of which are incorporated herein by reference), uses two linear partial fingerprint sensors, located about 400 microns apart.

Another device is described in U.S. Pat. No. 6,002,815 of Immega, et al. The technique used by the Immega device is based on the amount of time required for the finger to travel a fixed distance between two parallel image lines that are oriented perpendicular to the axis of motion.

Still another technique is described in U.S. Pat. No. 6,289,114 of Mainguet. A device utilizing this method reconstructs fingerprints based on sensing and recording images taken of rectangular slices of the fingerprint and piecing them together using an overlapping mosaic algorithm.

In general, both users and manufacturers of electronic devices find it desirable to incorporate as much functionality as possible into as limited a space as possible, and produce high functionality devices as cheaply as possible. Thus devices that perform multiple functions with minimal amounts of device "real estate", power, and manufacturing costs are generally preferred.

Although some prior art devices have addressed issues of user fingerprint identification, and other prior art devices have addressed issues of how to efficiently control and navigate through electronic devices using hand and finger motion for such control purposes, no completely satisfactory devices that allow for both user identification and precise user control of an electronic device have yet been marketed. Prior art devices that attempt to unify such user identification and device control functions primarily consist of relatively large mouse devices or mouse pads with a fingerprint sensor added somewhere on the device. Such devices are represented by U.S. Pat. Nos. 6,337,919; 6,400,836; and 5,838,306. Unfortunately, these prior art devices have tended to be both large and expensive, and thus have achieved only limited use as premium optional extras in business desktop and laptop computers.

If this type of fingerprint recognition and easy user navigational control could be produced in an extremely small, low cost, and low power device, this type of device could be used in a much broader variety of applications, and would likely be well received by both manufacturers and users.

Therefore, there exists a need in the art to more accurately sense finger swiping motion across a fingerprint sensor and to accurately calculate the speed and location of the finger that is in motion across the sensor. There also exists a great need in the art for a more efficient means to accurately sense and capture fingerprints on portable microprocessor controlled devices (e.g. cell phones, smart cards, PDA's, laptop computers, MP3 players, and the like). There is also a need for more convenient and efficient ways to provide navigation and control operations on such portable devices. As will be seen, the invention provides for these multiple needs in an elegant manner.

SUMMARY OF THE INVENTION

Further improvements in the finger location and movement sensing technology previously disclosed in patent and published U.S. Pat. Nos. 7,099,496, 7,146,024, US 2005-0235470 A1, and US 2005-0244039 A1 are possible, and some of these additional improvements are described herein. These improvements include deep finger penetrating radio frequency (RF) based partial fingerprint imagers that can be inexpensively printed or formed on flexible dielectrics, such as Kapton tape, and which produce robust combination fingerprint scanners and "finger mouse" devices.

These enhanced accuracy finger position and motion sensors can be used in a greater variety of different applications. These higher accuracy finger motion sensors may be used (either with or without a partial fingerprint imager) to control electronic devices. When several of these finger motion and position sensors are aligned in different directions, finger motion over a two dimensional surface may be detected. This allows a new type of finger controlled "mouse" electronic input device to be created. Motion of a finger along the surface of such sensors may allow a user to control the movement of an indicator on a display screen, and control an electronic or microprocessor controlled device.

Such sensors are particularly useful for small space constrained devices, such as cell phones, smart cards, music players, portable computers, personal digital accessories, and the like. Here ergonomic considerations and tactile feedback may facilitate use of such sensors, and use of textured surfaces and other techniques to achieve this end are discussed. Since such small space constrained devices are often designed to be both very robust and extremely low cost, techniques and methods to produce robust and cost effective sensors are also highly useful, and these techniques and methods are also discussed.

DETAILED DESCRIPTION OF THE INVENTION

Figure 1A:
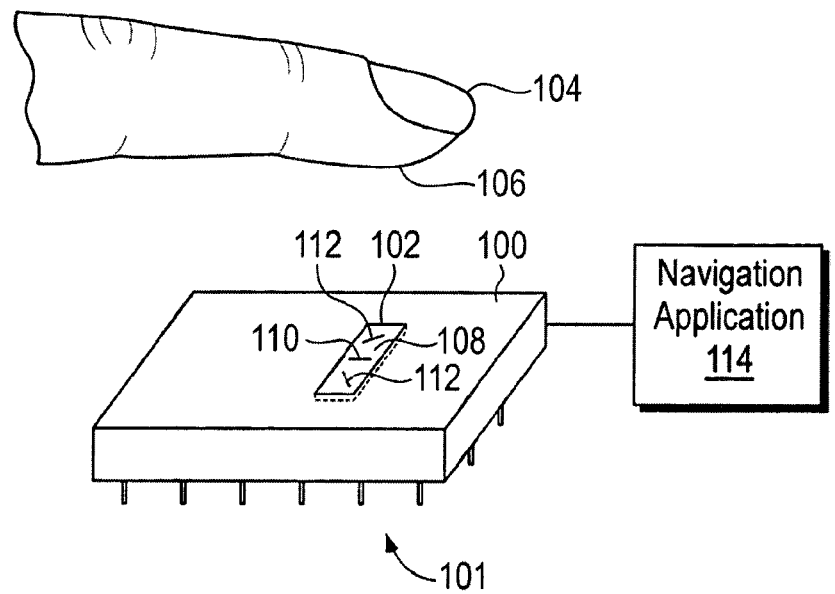
FIG. 1A is a diagrammatic view of an integrated chip version of the sensor configured according to the invention.

The invention uses multiple partial fingerprint readers (imagers), and algorithms capable of analyzing the output from these readers, to detect changes in fingerprint images as a finger moves over the imagers. This information can be used to provide finger motion information, or to produce fingerprint images, or both as desired by the particular application. By arranging the multiple partial fingerprint readers in different directions on a surface, finger motion in two dimensions may be detected, and this finger motion information used to control a wide variety of electronic devices.

Because, as will be discussed, these partial fingerprint readers or imagers are capable of detecting finger motion, they will often be referred to in this document in the alternative as "motion sensors" or "independent relative motion sensors".

The partial fingerprint readers used as independent relative motion sensors are typically based on a linear array of sensing elements (pixels) that capture a narrow one dimensional array (string) of data that is indicative of fingerprint features along a linear portion of the underside of a finger. This is essentially a one dimensional slice of a two dimensional fingerprint. This string of data is used to determine the velocity of finger travel for use in navigation operations. By using multiple sensors arranged in different directions, finger motion and direction data can be computed, and this data can be used to determine the finger motion over the two dimensional surface of the sensor. Like a standard "mouse" pointing device, this two-dimensional finger motion data can be used to move a cursor on a monitor, or otherwise navigate over various menu and selection options on an electronic device.

In operation, the linear sensor array used in the partial fingerprint imager (motion sensor) senses and captures fingerprint features in the form of a string of data signals by first sensing the fingerprint features in an initial sensing and image capture step. A short time later (usually a fraction of a second); another image of the finger features is captured. If the finger is stationary, the two partial fingerprint images will be the same, but if the finger is in motion, usually a different portion of the fingerprint will be imaged and the two images will differ. The more the finger moves, the more different the two images will be.

To generalize, the first image capture operation or step is followed by one or more subsequent operations or steps where a sample is taken of a subset of the fingerprint features again after known time period. This time period may be predetermined or measured as time progresses between sensing and capturing of the samples. Once at least two samples are taken, the subsequent sample is compared against the previous sample to determine the amount of shift or change in the previous sample relative to the subsequent sample. In one embodiment, a single linear line of sensor pixels is used to sense a one-dimensional track of fingerprint features, and the signal sensed by the pixels is converted from an analog signal to a digital signal, where the features are then represented as a one dimensional array (string) of digital values. For example, the ridges of the fingerprint features may be represented as logical ones, and valleys represented as logical zeros. Often, the actual values will be expressed with 8 bits of feature height per pixel (0-255), but other levels of per-pixel fingerprint feature resolution (e.g. 1-bit, 2-bit, 4-bit, 8-bit, 12-bit, and 16-bit) are also quite feasible.

A variety of different partial fingerprint imagers may be used for this purpose. Although, to keep this disclosure, to a manageable length, most of the examples of linear sensor arrays will be based on deep finger penetrating radio frequency (RF) based sensors described in U.S. Pat. Nos. 7,099, 496; 7,146,024; and published patent applications US 2005-0235470 A1; US 2005-0244039 A1; US 2006-0083411 A1; and US 2007-0031011 A1; it should be understood that this particular example is not intended to limit the scope of the invention in any way. Other methods, such as optical sensors, pressure sensors, etc. may also be used.

When compared, the first string of digital values from one sample can be compared to the second string in a one to one relationship (e.g. comparing, on a per pixel basis, the fingerprint feature data on the first string with the fingerprint feature data on the second string), and a similarity score can be produced that measures the number of matching values. If there is an immediate match, where both strings are substantially identical, then this would indicate that there was no finger movement during the time between which the two samples were taken. If there is not an immediate match, then this would indicate that there was some finger movement, and additional comparisons may be needed to determine the distance traveled. For each comparison, the strings of digital values can be shifted one or more pixels at a time. Once a good match is found, the distance traveled by the fingerprint is simply the number of pixels shifted times the distance between the pixels, which may be measured from the center point of one pixel to the center point of another pixel in the array of pixel sensors, for example.

In one embodiment, a predetermined number of comparisons can be made along with corresponding similarity scores. The process may then choose the highest score to determine the most accurate comparison. The number of pixels that were shifted to get the best comparison can then be used to determine the finger distance traveled, since the size of and distance between the pixels can be predetermined, and the number of pixels can thus be used to measure the distance traveled by the fingerprint across the motion sensor over the time period of the motion.

In another embodiment, the process could make comparisons and generate scores to measure against a predetermined threshold, rather than making a predetermined number of comparisons. In this embodiment, the similarity score from each comparison can be measured after the comparison is made. If the score is within the threshold, then it can be used to indicate the amount of shift from one sample to another. This can then be used to determine the distance traveled by the fingerprint across the linear motion sensor.

In one embodiment, generally, the invention provides a fingerprint motion tracking system and method, where a single linear sensor array is configured to sense features of a fingerprint along an axis of finger motion. The linear sensor array includes a plurality of substantially contiguous sensing elements or pixels configured to capture a segment of image data that represents a series of fingerprint features passing over a sensor surface.

A memory buffer (usually random access memory (RAM), but alternatively flash memory, EEPROM, or other memory) is configured to receive and store image data from the linear sensor array. And, a data "processing element" (often a microprocessor and a relevant driver program) is configured to generate fingerprint motion data. The linear sensor array may be configured to repeatedly sense at least two substantially contiguous segments of fingerprint data, and the processor can generate motion data based on at least two sensed contiguous segments of fingerprint data. In operation, the linear sensor array is configured to sense a first set of features of a fingerprint along an axis of finger motion and to generate a first set of image data captured by a plurality of substantially contiguous pixels of the sensor array. The linear sensor array is also configured to subsequently sense a second set of features of the fingerprint along an axis of finger motion and to generate a second set of image data captured by a plurality of substantially contiguous pixels of the sensor array. The processing element can then compare first and second sets of image data to determine the distance traveled by the fingerprint over a time interval.

As used herein, linear sensor array is a generic term that relates to a portion of sensing elements, whether they are pixels in an optical reader, a static or radio frequency reader that reads electric field intensity to capture a fingerprint image, piezoelectric components in touch-sensitive circuit fingerprint readers, or other elements indicative of fingerprint readers, where the elements are used to sense a portion of the fingerprint, rather than the entire fingerprint. Such sensor arrays may be configured in a number of ways within a matrix of well known sensor devices. As previously discussed, several modern configurations are described and illustrated in pending U.S. Patent Application Publication Number US 2006-0083411 A1 entitled: Fingerprint Sensing Assemblies and Methods of Making; U.S. Patent Application Publication Number US 2005-0244039 A1 entitled: Methods and Apparatus for Acquiring a Swiped Fingerprint Image; U.S. Patent Application Publication Number US 2005-0235470 A1, entitled: Fingerprint Sensing Methods and Apparatus; U.S. Pat. No. 7,099,496 entitled: Swiped aperture capacitive fingerprint sensing systems and methods, and other applications that are all assigned to common assignee Validity, Inc. Also, many other types of sensor matrices exist in the art directed to capturing fingerprint images. The invention is directed to a novel system, device and method that is not limited in application to any particular sensor matrix or array configuration. In fact, the invention can be used in conjunction with or incorporated into such configurations to improve performance, and further to reduce the processing resources required to capture and reconstruct images.

According to the invention, the linear sensor is substantially contiguous, which is to say that the sensor elements are in a relative proximity to each other so that a first reading of a portion of fingerprint features can be taken, followed by a second reading after a short period of time from another position. The two samples can be compared to determine the relative distance traveled by the fingerprint surface in relation to the sensor surface. The linear sensor is configured to merely take a relatively small sample of the fingerprint at one point in time, then another at a subsequent time. These two samples are used to determine movement of the fingerprint. Two or more samples maybe compared in order to compute direction and velocity of a fingerprint surface relative to the linear sensing elements. These samples may be linear, as described below and illustrated in the drawings, so that a linear array of fingerprint features can be recorded and easily compared to provide a basis for motion, distance traveled over time. If more than one sensor is employed, it is possible to determine direction of motion using vector addition with the different linear samples taken. Thus, some of the functions provided by the invention are a result of taking a linear sample to give a basis for vector analysis. However, those skilled in the art will understand that, given the description below and the related drawings, other embodiments are possible using other configurations of motion sensors, which would not depart from the spirit and scope of the invention, which is defined by the appended claims and their equivalents, as well as any claims and amendments presented in the future and their equivalents.

One useful feature of the invention is that ambiguity in results is substantially prevented. If properly configured, a system configured according to the invention can consistently produce a result, where at least two samples can be taken such that the features of one sample overlap with another sample. Then, comparisons can be made to determine the amount of shift, indicating the amount of movement of the fingerprint across the linear sensor. In prior art systems and methods, it is often the case that no result occurs, and a singularity results. Thus, a user would need to repeat sensing the fingerprint. In some systems, substantial predictor algorithms have been created in an attempt to compensate or resolve the singularity when it occurs. Such applications are very large and demand a good deal of computation and processing resources, which would greatly bog down a portable device. According to the invention, sensing motion of a fingerprint is substantially certain, where samples taken from the fingerprint surface are consistently reliable. This is particularly important in navigation applications, where relative movement of the finger translates to movement of an object such as a cursor on a graphical user interface (GUI), discussed further below.

In one embodiment, the linear sensor array may be used alone to determine linear movement of a fingerprint. In another embodiment, the single sensor array may be used in conjunction with one or more other linear sensor arrays to determine movement in two dimensions. In either embodiment, the linear sensor arrays are utilized solely for determining motion. If the motion of the analyzed fingerprint occurs generally along a predetermined axis of motion, the single linear sensor array can be utilized to sense the velocity of the fingerprint being analyzed. To capture and record the motion of a fingerprint that is not directed along a predetermined axis of motion, two or more linear arrays (a plurality of arrays) can be used together to sense and record such motion, and a processor can determine the direction and speed of the fingerprint using vector arithmetic.

In yet another embodiment, one or more such linear arrays may be used in conjunction with a fingerprint sensor matrix to more accurately capture and reconstruct a fingerprint image. The sensor matrix can be configured to sense and capture an image of a portion of a fingerprint being analyzed, and the one or more linear arrays can provide motion information for use in reconstructing a fingerprint image. A device so configured would be able to more accurately sense, capture, record and reconstruct a fingerprint image using less processing resources than conventional devices and methods.

One advantage that the invention has over prior art (Immega and Mainguet for example), is that the invention separates the analysis of motion from the capturing of the entire fingerprint image. The concept described in Immega, for example, requires the entire image to be captured and recoded line by line. The lines are used to both determine speed of the object being sensed and recorded and also calculate the speed of the object as it is passed over the perpendicular slot. Immega requires immense processing and storage resources to sense, capture, record and reconstruct the image, and all of these functions are carried out by processing the entire lot of image data captured and recorded. Similarly, a device configured according to Mainguet must capture large portions of the fingerprint image and requires substantial processing and storage resources to overlap and match the image mosaics to reconstruct the image. In stark contrast, the invention provides a means for detecting motion of a fingerprint separately from the process of capturing a fingerprint image, and uses the motion information to more efficiently reconstruct the fingerprint image using less processing and storage resources. The invention further provides a means for generating navigation information using the same mechanism.

Alternatively, in yet another embodiment, one or more arrays can be used to generate motion information for use in accurate navigational operations, such as for use in navigating a cursor on a graphical user interface (GUI). Utilizing the improved processing functions of the invention, an improved navigation device can be constructed that is compatible with a portable device that has the power and processing restrictions discussed above. Examples of such embodiments are described and illustrated below.

A motion sensor configured according to the invention uses substantially less space and power compared to conventional configurations for motion sensing, navigation and fingerprint image reconstruction. Additionally, as will be discussed, sensors configured according to the present invention are very robust, and may be produced by an extremely low cost process, Such a configuration can further provide aid to conventional fingerprint reconstructing processes by better sensing motion of a finger while it is being analyzed by a sensing device. This allows a fingerprint sensing device the ability to reconstruct a fingerprint analyzed by a fingerprint sensor with reduced power. Utilizing the invention, conventional processes that need to match and construct fragmented images of a fingerprint, particularly devices that sense and process a fingerprint in portions, can be optimized with information related to fingerprint motion that occurs while a fingerprint surface is being read. Also, using this unique motion detection technology, optimal navigation functions can be provided that are both extremely small, extremely robust, and function with relatively low amounts of electrical power. Such navigation functions can enable miniaturized navigation devices to be integrated in a portable device system, such as a mouse pad used to move a cursor across a graphical user interface (GUI) on portable electronic devices including cellular phones, laptop computers, personal data assistants (PDAs), and other devices where low power navigation functions are desired. A novel system and method are provided that uses minimal space and processing resources in providing accurate motion detection from which fingerprint sensors as well as navigation systems can greatly benefit.

A device or system configured according to the invention can be implemented as a stand alone navigation device, or a device to provide image reconstruction information for use with a line imaging device that matches and assembles a fingerprint image. Such a line imaging device may be any imaging device configured to sense and capture portions of a fingerprint, whether it captures individual perpendicular image lines of a fingerprint, or multiple perpendicular lines. In operation, a motion detection device can operate as a separate motion detection and/or direction detection device. Alternatively, a motion detection device can be used in conjunction with a line imaging device to more accurately and efficiently sense, capture, store and reconstruct a fingerprint image. A device configured according to the invention may include a single array of finger ridge sensing pixels or data sensor points centrally located along the principal axis of motion to be detected, a sampling system to periodically sample the finger contact across the array, and a computational module or element that compares two sets of samples collected at different times to determine the distance traveled while between the two sample times. According to the invention, the motion sensor pixels do not necessarily need to have the same resolution as the line imager. The motion sensor pixels may in fact use a different sensing technique than the imager.

Again, the invention provides separate operations for detecting motion and for sensing and capturing a fingerprint image. Thus, the techniques used for the separate processes can be the same or may be different depending on the application. Those skilled in the art will understand that different variations of the separate processes are possible using known techniques and techniques can be derived without any undue experimentation. Such variations would not depart from the spirit and scope of the invention.

In another embodiment, the invention provides the capability of multi-axis motion sensing with additional off-axis sensing arrays. In this embodiment, there are two or more (a plurality of) sensor arrays for detecting motion, and each axis is independently measured to determine the component of velocity in that axis. The velocity components from the individual axes are used to compute a vector sum to determine the actual direction and velocity of motion of the finger with respect to the sensor surface. According to the invention, it is not necessary to capture the full image of the fingerprint in order to determine the distance traveled and the velocity. It is only necessary to capture a linear sample of fingerprint features along the line of motion of the fingerprint. In one embodiment, a plurality of samples, such as two or three samples, are captured by motion sensor pixels and are used to determine the distance traveled across the axis of motion of the fingerprint relative to the sensor surface and the velocity at which the motion occurs. This information can also be used in navigational operations, and can further be used in combination with a fingerprint imager to aid in reconstructing a fingerprint image. Utilizing the invention, either application can be configured in an economical and useful manner. Moreover, the operation of such a sensor or navigational device can be optimized to consume substantially less power than conventional devices, which require excessive processor operations for reassembly of the fingerprint image. And, given the motion information generated by a system configured according to the invention, the distance traveled and velocity of the fingerprint can be used to more accurately and efficiently reconstruct a full fingerprint or to better represent relative motion information for use in navigation.

Aligning the pixels along the axis of motion, rather than perpendicular to it, enables the use of motion detection algorithms that can be both time-variant and distance variant. This enables development of algorithms that utilize short distance measurement over long time periods for low speed motion and longer distance motion to more accurately measure higher speed motion, thus optimizing response time and accuracy. Both embodiments share the advantages gained by acquiring and comparing multiple spatial measurements of the fingerprint pattern at each sampling instance. Because multiple samples are taken and compared simultaneously, effects of sampling error, both due to noise and imprecision in the sampling of the finger pattern, are minimized. Also, because samples are taken at multiple locations along the axis of motion simultaneously at each sampling period, the images from two sampling periods can be compared to detect if there had been any significant finger motion between the two sample times. One shared advantage is that both systems are capable of detecting under-sampling of the image being acquired by the line imager, as a consequence of their ability to detect motion of multiple pixels in a short time interval.

An embodiment using a single segmented motion sensor array offers the advantage of detecting motion over a shorter range of distance. This provides faster response time, particularly at low finger speeds that may be encountered in navigation applications. Because this embodiment is sensitive to single pixel motion, it provides unique features that may also reduce the memory requirements for the computational elements. In order to provide a navigation device, as well as to detect and correct for finger motion that is not completely aligned with the desired axis, either of the embodiments may be combined in ensembles such that one sensor is aligned on the axis of motion, and additional sensors aligned at an angle (such as 22.5 or 30 degrees) to the principal axis of finger motion. Examples of different embodiments are discussed below.

Referring to FIG. 1A, a diagrammatic view of motion detection and tracking system configured according to the invention is illustrated. An integrated circuit package (100) is illustrated having circuits and possibly software embedded (not shown) and electrical connections (101) for integration in and connection with a system that utilizes the circuit package. FIG. 1A illustrates an embodiment of the invention where a finger (104) can move its fingerprint surface (106) against sensor surface (108) to be read by the sensors (110), (112). These sensors can pick up movement information of the finger's fingerprint for use in navigational applications, or can be used in conjunction with an integrated fingerprint sensor surface (108) to simultaneously capture and record portions of a fingerprint. Such a system configured according to the invention may be a stand alone component as shown, or can be integrated with other circuits for more space and power savings as well as efficiency. Those skilled in the art will understand that many variations of the configuration are possible, and that the invention is not limited to any particular configuration, but is defined by the claims and all equivalents.

The system further includes a sensor module (102) that is used to sense the fingerprint surface (106) of a user's finger (104) when the finger is moved across fingerprint sensing surface (108). As can be seen, the fingerprint sensing surface (108) is illustrated as a narrow surface that is designed to sense and capture portions of a fingerprint as it is moves across the sensor. These portions can be subsequently reconstructed according to the invention using motion information from the motion sensors (110), (112). Thus, the sensor components illustrated in FIG. 1A have multiple utilities, and can be configured in devices that utilize part or all of such utilities, whether it is a stand alone motion sensor configured to sense movement and velocity in one direction, a multidirectional motion sensor configured to sense movement and velocity in several directions, or a combination device configured to sense motion either in one or more (one or more meaning a plurality of directions) directions and used in combination with a fingerprint sensor surface that reads portions of fingerprints and reassembles the fingerprints using the motion information from motion sensors. The features and benefits of several embodiments of the invention are discussed and illustrated below. Again, these are intended as mere examples of different embodiments, and are not intended as an exhaustive set of samples. And again, those skilled in the art will understand that these and other embodiments of the invention described herein are illustrative of the invention and are not intended to limit the spirit and scope of the invention, which is defined by the appended claims and all equivalents, including claims appended herein upon filing and also those as possibly amended at a later date.

Figure 1B:
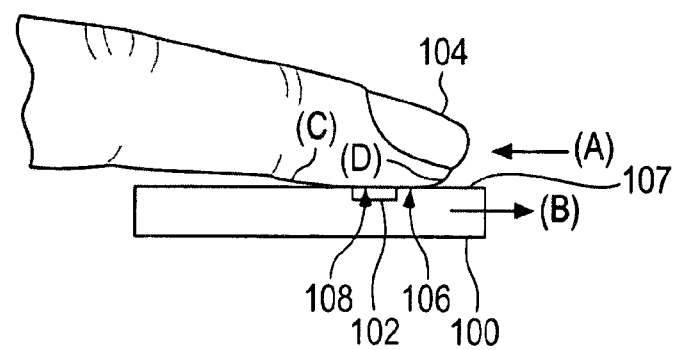
FIG. 1B is a diagrammatic view showing a finger moving over the sensor of FIG. 1A.

Referring to FIG. 1B, a side view of the sensor system of FIG. 1A is illustrated. In operation, the finger (104) is placed by a user onto the sensor surface (107), which includes fingerprint sensing surface (108), so that the fingerprint sensing surface (108) and the sensor surface (106) are juxtaposed relative to each other. The user moves the finger (104) across the surface of sensor (100) resulting in the finger and the sensor surface movement in opposite directions A, B. The net effect is to allow sensor (102), which is a partial fingerprint analyzer, to move across and analyze a larger portion of fingerprint surface (106).

In different applications and devices, this interaction may take on many forms. A user may hold his or her finger stationary, and move the device that the sensor is attached to. In this mode, the fingerprint surface is stationary and sensor (102) moves relative to the fingerprint, not unlike a moving scanner in a photocopy machine. More typically, the sensor will be fixed to a surface, such as on the surface of a laptop computer or cellular phone, and the user will move his or her finger over the sensor. The net effect here is to move the fingerprint surface (106) by rubbing it against and along the fingerprint sensing surface (108). The net effect is the same, and again, the sensor (102), which is a partial fingerprint imager, can analyze and read a larger portion of the fingerprint.

As previously discussed, when used in conjunction with deep finger penetrating radio frequency (RF) based sensor technology; the techniques of the present invention lend themselves to robust sensors and a low cost manufacturing process. As discussed in U.S. Pat. Nos. 7,099,496; 7,146,024; and published patent applications US 2005-0235470 A1; US 2005-0244039 A1; US 2006-0083411 A1; US 2007-0031011 A1, incorporated herein by reference, suitable linear partial fingerprint imagers or linear motion sensors can be produced by simply printing conducting circuit traces (electrodes, electrical traces or conducting traces) on the surface of a flexible dielectric tape or thin film substrate, such as a polyimide tape. Often the Kapton® tape produced by DuPont Corporation will be suitable for this purpose, and thus will be used throughout as a specific example of a suitable substrate or support for the present invention.

Often it will be convenient to bond one or more integrated circuit chips, used to drive the sensor, to the Kapton tape, producing a complete sensor.

Figure 1C:
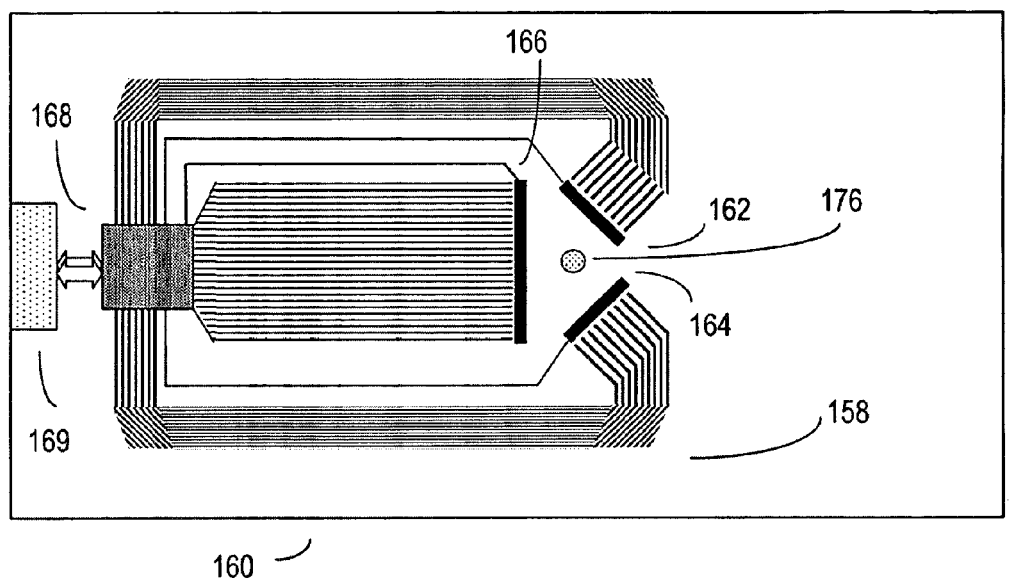
FIG. 1C shows an example of a Kapton tape circuit layout for one form of the invention.

Referring to FIG. 1C, an example of such a thin film flexible sensor is shown. This simplified example shows an overview of some of the electrical traces (158) that can be printed on a single side of the Kapton tape (160). (For further reference and further detail, please see FIG. 1B of commonly owned U.S. Pat. No. 7,099,496 and FIG. 6 of commonly owned US patent publication US 2006-0083411 A1, both incorporated herein by reference). In this simplified example, the electrical (conducting) traces for a large partial fingerprint imager, suitable for producing fingerprint scans, are shown (166). Two smaller partial fingerprint imagers (162), (164) (which roughly correspond to the sensors (112) and (108) shown in other figures) which are used as finger motion detection sensors, are also shown.

Since a single wide or full linear sensor (166) is all that is needed to create a fingerprint image for user authentication and verification purposes, the other sensors (162), (164) used for finger motion detection do not need to be as large as the "imaging" fingerprint sensor. Since these "finger motion detection" sensors can be smaller and still function adequately, it often will be convenient to pack a larger number of small motion detection into a device in order to determine finger motion with higher accuracy. Using a larger number of motion sensors makes the system more robust to variations in user technique, and capable of more accurate finger motion determination.

Figure 1D:
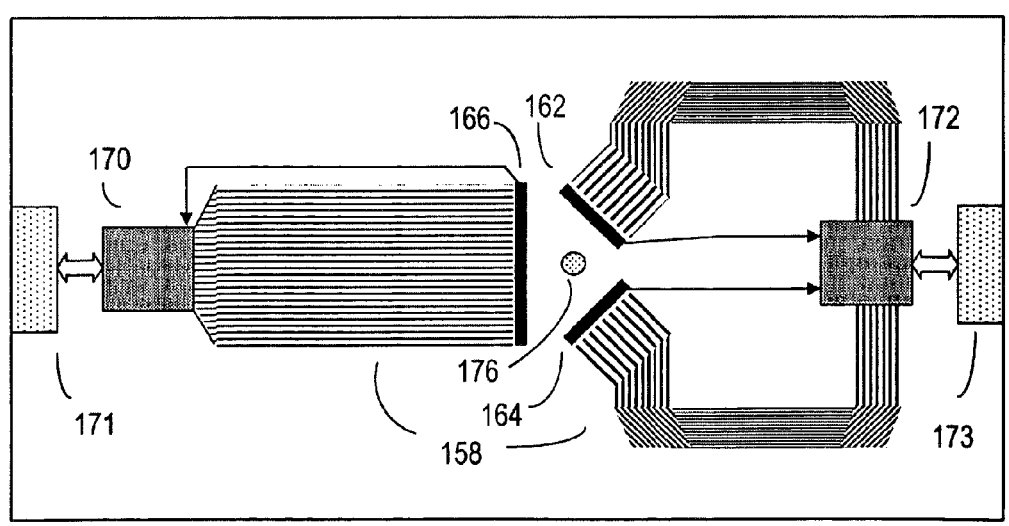
FIG. 1D shows an example of an alternative Kapton tape circuit layout for one form of the invention.

Note that although FIGS. 1C and 1D give details of the electrode traces used to produce the partial fingerprint sensors, for most of the figures in this disclosure, these traces are not normally drawn. Rather, the convention will be to show sensors (162), (164) as a simple line.

In this type of embodiment, the conductive elements (traces) (158) form a one dimensional array, where each trace corresponds to a pixel in the array. The traces are sequentially excited by the IC chip (168), (170), (172), which driving the traces with short bursts of oscillating electrical current. Topographic variations in the underside of the finger (the fingerprint) modulate this signal, which is picked up by a sensing pickup plate (166), (162), (164) mounted at a right angle to the traces, and separated from the traces by a small gap. Essentially the IC chip scans through the various traces, detects the corresponding signal at the pickup plates (166), (162), (164), and analyzes the result. A higher fingerprint ridge will return a different signal than a fingerprint valley, and a one dimensional image of the underside of the finger (the fingerprint) immediately on top of the pickup plate (166), (162), (164) results. By moving the finger, successive potions of the underside can be imaged.

In FIG. 1C, a single integrated circuit chip (IC) (168) (similar to chip (116) is used to drive both the larger partial fingerprint imager used to create a fingerprint image, as well as the smaller partial fingerprint imagers used as motion detectors or sensors. In this case, this IC may have its input and output (I/O) (169) to additional circuitry positioned outside the Kapton tape support at a single location.

Referring to FIG. 1D, an alternative configuration of the Kapton tape based sensor device is shown. In this alternative configuration, a first integrated circuit chip (170) is used to drive the larger partial fingerprint imager used for fingerprint sensing (166), and a second integrated circuit chip (172) (similar to chip (116)) is used to drive the various smaller partial fingerprint imagers (162), (164) used for motion detection. Thus in this example, the first IC (170) has its fingerprint scan input and output (I/O) to additional circuitry positioned outside the Kapton tape support at a first location (171), and the second IC (172) has its finger motion sensor data input and output (I/O) to additional circuitry positioned outside the Kapton tape support at a second location (173).

Both FIGS. 1C and 1D show a central ergonomic bump (176) or surface texture feature, which is designed to allow the user to get a tactile sensation when the user's finger is positioned over the approximate center of the geometric figure formed by the various partial fingerprint scanners. This will be discussed in more detail shortly.

In both FIGS. 1C and 1D, the circuitry was only on one side of the Kapton tape. It should be evident that by moving to multilayer circuits (in which the different layers of circuit traces are separated by insulating layers) and/or thinner conducting traces, far more partial fingerprint sensors may be placed on a device. Some examples of devices with a substantially larger number of partial fingerprint sensors will be shown in FIGS. 2F, 2G, and 7-10.

As was discussed previously, and as will be discussed later in this disclosure as well, these miniaturized, robust, and low-cost sensors lend themselves well for incorporation into a variety of different low-cost electrical devices. Often the users of such devices (such as MP3 players, cell phones, and the like) will be using the devices under less than ideal conditions. Here, use may be facilitated by various ergonomic measures, such as texturing the surface of the sensor with various tactile cues designed to help guide the user's finger to the position of the "mouse" most optimum for either device control and or fingerprint scanning. Often this can be done by providing various bumps or other texturing on the surface of the scanner, ideally positioned in useful locations. As an example, in the case where a two dimensional finger motion sensor (mouse) device consists of multiple partial fingerprint imagers arranged in a geometric pattern, then placing a bump near the center of this pattern (176) will signal the user that placing a finger near this central bump will likely produce optimal results in terms of finger motion sensing and device control. Similarly, placing other textures or bumps near the circumference or perimeter of the geometric pattern of partial fingerprint imagers will signal to the user the boundaries where the device is no likely going to be able to detect finger motion with optimal sensitivity. By use of such tactile feedback, users may rapidly become adjusted to the device, and obtain good results with a minimal training curve.

Figure 1E:
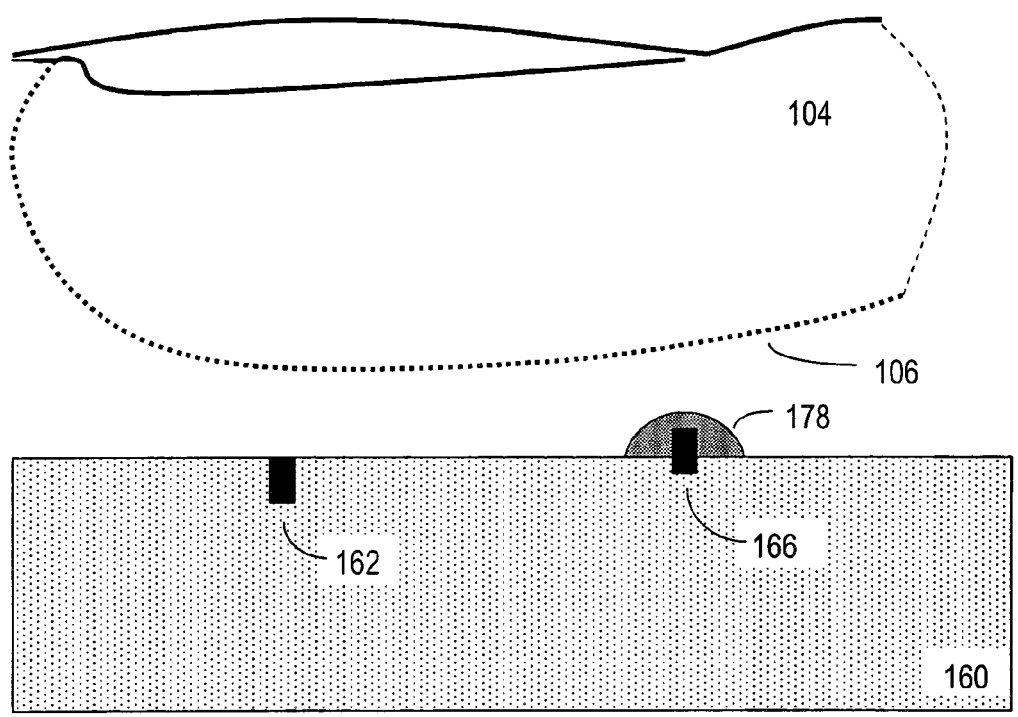
FIG. 1E shows how surface textures can guide a user's finger during a fingerprint scan.

Referring to FIG. 1E, a finger (104) with a fingerprint (106) is positioned with a single ergonomic "bump" (tactile feature) (178) positioned over a wider partial fingerprint imager (166), used for generating finger print images, is shown. This configuration may be most optimal for the situation where the primary purpose of the sensor is to produce good fingerprint scans, and mouse control is a secondary feature. The user will receive good knowledge of where the location of at least one partial fingerprint imager (166) is (normally the largest partial fingerprint imager), but will not be distracted by tactile information pertaining to the finger motion sensors (162).

Figure 1F:
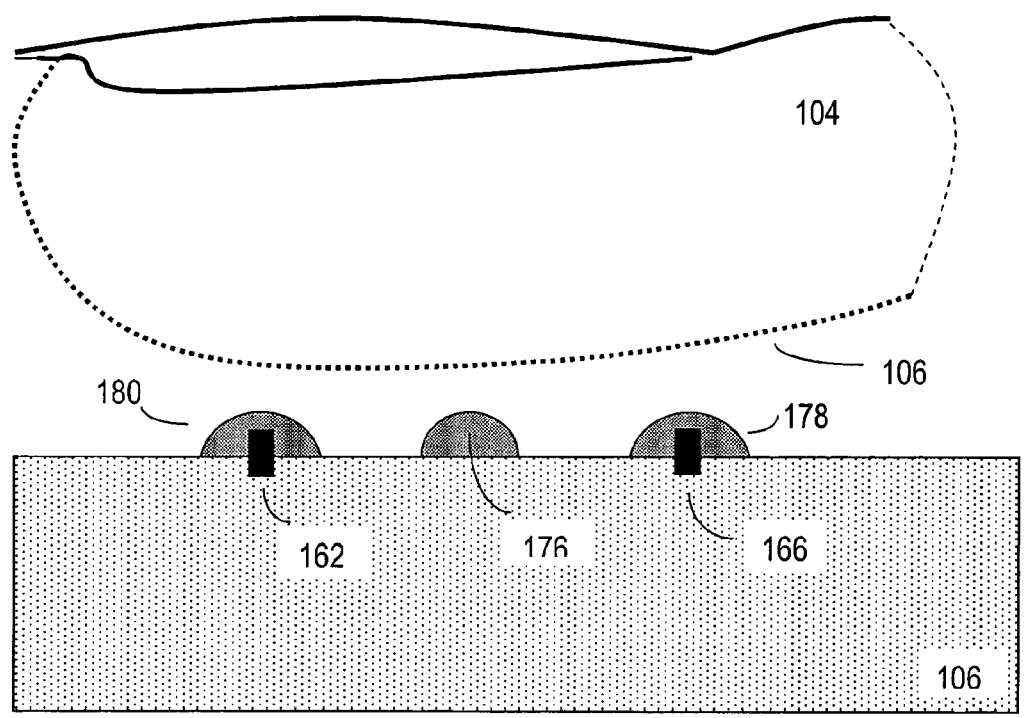
FIG. 1F shows an alternative surface texture useful for guiding a user's finger for more precise mouse control.

Referring to FIG. 1F, an alternate configuration is shown. Here a finger (104) is positioned over sensor surface that contains multiple ergonomic "bumps" or "tactile features" (178), (180) positioned over various partial fingerprint imagers (here used for motion detection (162) as well as fingerprint imaging (166)). The surface also has as an additional bump located near the geometric center of the various partial fingerprint imagers (176). This configuration may be most optimal for the situation where the primary purpose of the sensor is to act as a high quality "mouse" by allowing finger motion to control the function of an electronic device.

Such surface textures may be produced by either putting a bump on the surface underneath the thin flexible Kapton tape support, or alternatively by depositing material on top of the Kapton tape support. When it is desired to give the sensors (166), (162) or (164) texture, often it will be useful to put the bump on a surface underneath the Kapton tape. The thin flexible Kapton tape can then be placed on top of this support+textured bump, and the Kapton tape then rides up over the bump and then down again, creating the final textured bump. This causes the electrical circuit traces or electrodes on the Kapton tape to press more firmly against the underside of the finger in these regions, and can improve sensitivity.

Figure 2A:
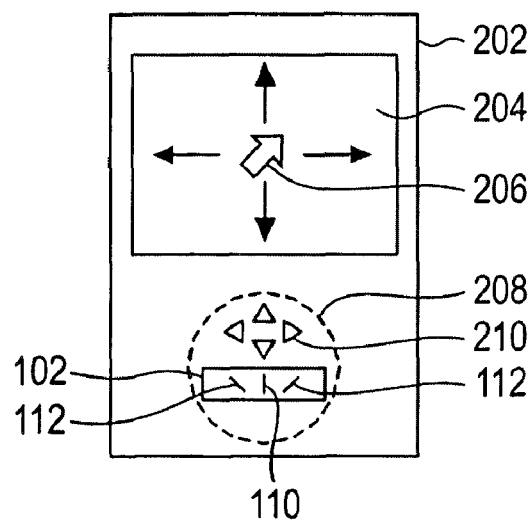
FIG. 2A shows how the sensor may be used to control a cursor on the display screen of a small, handheld, electronic device.

Referring to FIG. 2A, one practical application of a navigational system is illustrated, where a portable device (202), such as a portable music player, a cellular phone, PDA or other device, has a graphical user interface (GUI) or screen (204). Here a cursor (206) may appear on the screen that is capable of being moved across the screen under control of a user navigating a touch-sensitive cursor (208). The touch sensitive cursor has navigational indicia (210), which may be merely directional indicators located about sensor (102) that is located within or about that touch-sensitive cursor that acts as a navigational pad, similar to that of a mouse pad commonly used on laptop computers. According to the invention, such a navigational pad can be greatly enhanced using sensor technology according to the invention, where directional movement sensors (110), (112) are used to guide the cursor (206) for searching for and selecting indicia such as toolbar items or icons for opening files, photos and other items when selected. In some applications, a multi-step sensor can read the fingerprint structures for guidance at one level, and may select indicia by pressing harder on the sensor for another level of sensing. Thus, a user can move the cursor around by lightly pressing on and moving a finger along the surface, then pressing harder when selecting an icon, toolbar or other indicia. Utilizing the invention, a more efficient navigation tool can be adapted to perform all of these tasks at low power and high accuracy, a very adaptable feature for portable devices.

Figure 2B:
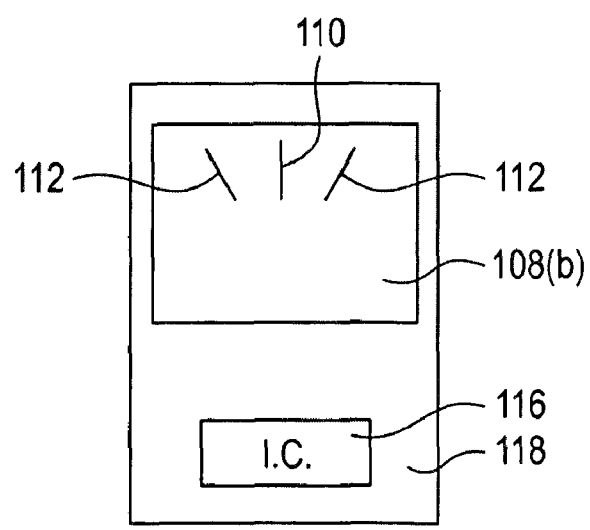
FIG. 2B shows an alternate version of the Kapton tape form of the invention, here showing three finger motion sensors in an abstract form.

Referring to FIG. 2B, an abstraction of a device similar to the Kapton tape sensor device previously shown in FIG. 1C is illustrated. As per FIG. 1C, the integrated circuit (IC) chip (114) is separate from the sensor surface (108(b)). In this diagram, as well as most of the subsequent diagrams, the electrical traces or circuits that connect the sensor with the IC used to drive the sensor are not shown.

Although use of Kapton tape has a number of advantages, other substrates may also be used for the present invention. For example, a ceramic or plastic substrate, such as are frequently used in integrated circuit housings, may be used. In the illustration of FIGS. 1A and 1B, the sensor surface may be located on top of an IC as in many conventional configurations, but with the novel array sensors (110), (112) of the invention. FIG. 2B illustrates a novel configuration where the sensor surface (108(b)) is located on a film (118), and the IC (116) is located separately, allowing for more flexible and useful applications. This type of embodiment is particularly appropriate for deep finger penetrating radio frequency (RF) based sensors, but may also be quite useful for optical sensors and other types of sensors as well.

As discussed herein, the invention can be applied either type of configuration, and is adaptable to any application where motion and direction information may be useful, such as for navigating objects such as cursors on a graphical user interface, or other applications.

Referring again to FIG. 1A, the surface (108) has embedded motion sensors (112) that, according to the invention, operate to detect the presence and motion of a fingerprint surface (106) about the sensor surface (108). A single motion sensor (110), aligned with a general fingerprint motion direction for detecting distance traveled by the fingerprint across the sensor over a period of time. This allows a processor to compute the velocity of the fingerprint over the sensor surface. In another embodiment, there may be a single motion sensor (110) on the surface (108), or there may be a plurality, two or more motion sensors (110), (112), on the surface (108), depending on the application. The additional sensors (112) may be used to detect direction of a fingerprint's motion across the sensor surface. In practical applications, a user may not move the finger exactly parallel with the sensor (110). A user may rub the fingerprint surface (106) at an angle with respect to the axis of the sensor (110). A processor analyzing the velocity of the fingerprint motion may then end up with an inaccurate velocity reading. This may be important when the data generated by the sensor is used for reconstructing a fingerprint, or when the sensor data is used for navigational purposes. According to this additional embodiment of the invention, the additional sensors (112) can be used to determine the direction of the fingerprint surface when it is being analyzed. Using the data captured by the sensors, a processor can apply vector analysis to generate motion information. This motion information can be used in processes for reconstructing the fingerprint images, or for navigation processes.

Figure 2C:
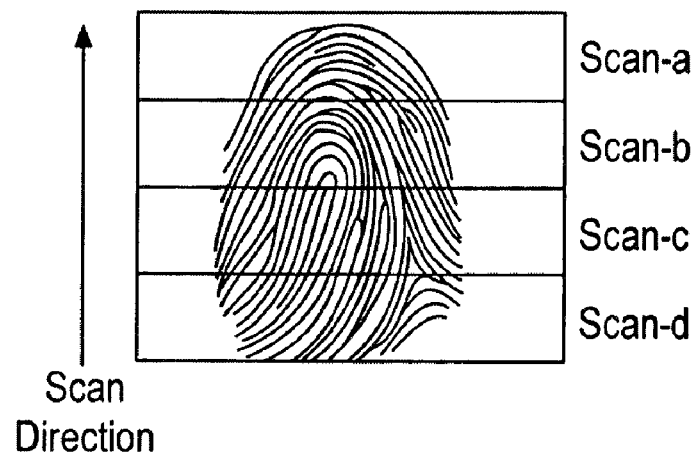
FIG. 2C shows a fingerprint being scanned in an up- and down manner.
Figure 2D:
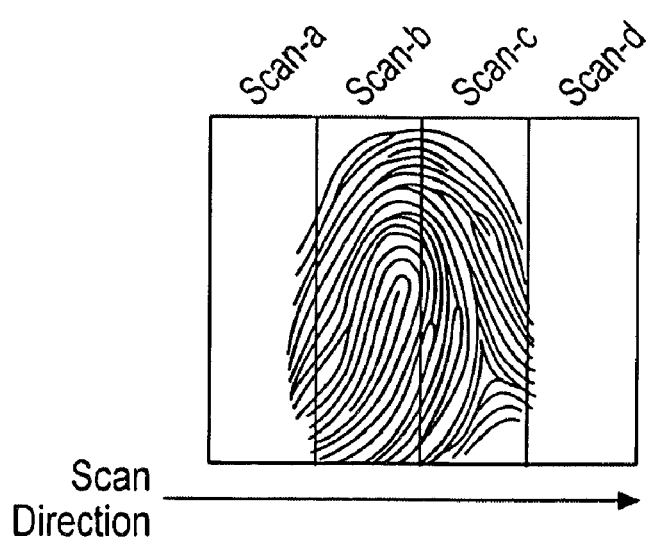
FIG. 2D shows a fingerprint being scanned in a side-to-side manner.

FIGS. 2C and 2D show a secondary advantage of the present invention. Although often it will be useful to make one partial fingerprint imager larger than the other partial fingerprint imagers used for motion detection, and require that the user always scan in a preferred direction when taking a fingerprint scan for fingerprint verification purposes, this is not always the case. In other embodiments, it may be useful to have at least two of the partial fingerprint imagers be of a larger size, and mounted roughly perpendicular with each other. In this configuration, the sensor may still be used for finger mouse control, but an additional advantage is that the user will also get a high quality fingerprint scan from multiple directions.

Figure 2E:
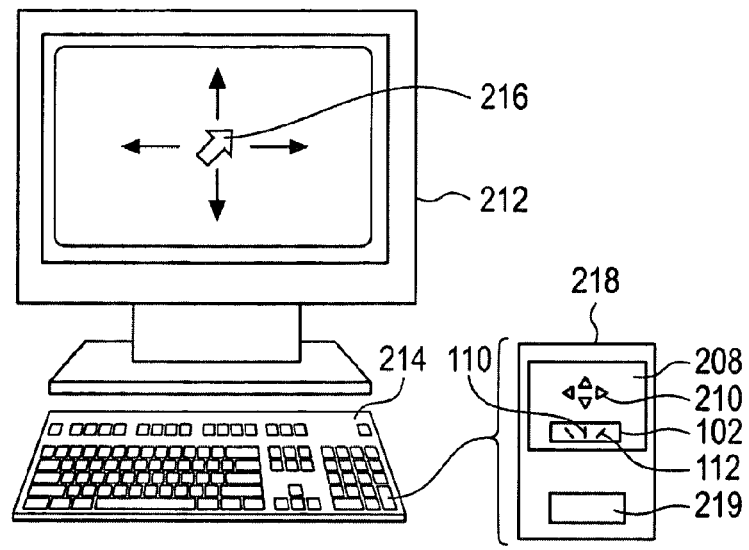
FIG. 2E shows the Kapton tape sensor being embedded in a keyboard and being used to control the mouse cursor display of a desktop computer.

Referring to FIG. 2E, another application of a navigation sensor for desktop computer control is illustrated. Here the sensor is used to provide navigational information to control a cursor (216) shown on computer monitor (212) of a conventional desktop computer system, where the navigational sensor (218) is provided as an alternative to a conventional mouse used for a computer. Such a mouse may be part of a keyboard as shown, or may be implemented as a separate device apart from the keyboard. The sensor (218) includes a sensor surface (208) that may have directional indicators (210) for a user, and array sensors (110), (112). The IC (219) may be separate from the sensor surface (208) as described above along with other similar figures showing various embodiments.

Figure 2F:
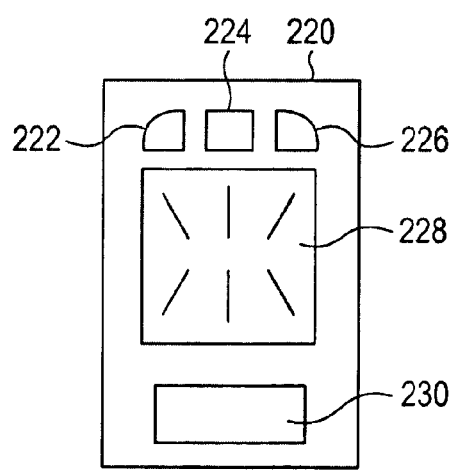
FIG. 2F shows an alternative sensor configuration.

Referring to FIG. 2F, yet another embodiment of a navigational sensor (220) is illustrated, which can also be implemented as an alternative to a conventional computer mouse. The sensor (220) may include individual sensors (222), (224), (226) for individual activation by a user. These individual sensors may be simple pressure activated buttons, RF sensors, or other sensors for selecting or otherwise manipulating or activating objects chosen on a monitor with a cursor. Such individual sensors may be integrated on the device (220), such as on a common Kapton film, or may be separate yet accessible by a user's touch. Sensor pad (228) includes array sensors configured to sense motion of a fingerprint surface relative to the pad. IC (230) may be configured on the same film, or may be entirely separate. The sensor (220) may be implemented on a keyboard such as sensor (218) of FIG. 2E, or may be implemented on a laptop computer, cellular phone, personal data assistant, automotive dashboard, or other device that could utilize the operations of the navigational sensor.

Figure 2G:
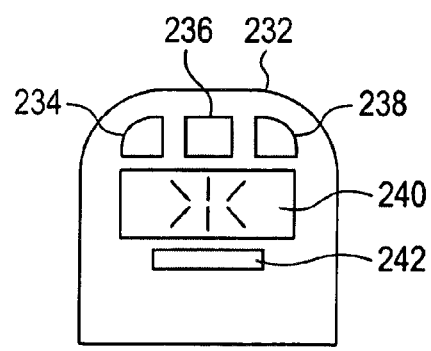
FIG. 2G shows another sensor configuration.

Referring to FIG. 2G, yet another embodiment of a navigational sensor (232) is illustrated. Sensor (232) is configured as a small fingerprint navigation sensor having sensors (234), (236), (238), a narrow slit sensor surface (240) and sensor (242). Each of the sensors can be configured to sense motion, pressure or other stimuli performed by a user in navigating operations. Those skilled in the art will understand that many variations of sensors, buttons and other accessories can be implemented according to the invention to allow a user to operate different devices, systems and operations with navigation information.

FIGS. 3-7 discussed below have a similar numbering pattern, where the sensor surface (107) includes the two other sensing surfaces: fingerprint sensing surface (108) and motion sensors (110) and (112). The different motion sensing devices, whether included with an image sensor for sensing a finger print image for future reconstruction, can be utilized for navigational operations. These different embodiments are described below in relation to sensing, capturing and reconstructing fingerprint images, but are also applicable in providing motion and direction information for use as navigational information, such as for use in navigating a cursor relative to the motion of a fingerprint over motion sensors. The different embodiments, though similar in general function, are separately described to differentiate the different components in the different embodiments. These are intended as mere examples of different embodiments, and are not intended as an exhaustive set of samples. Again, those skilled in the art will understand that these and other embodiments of the invention described herein are illustrative of the invention and do not limit the spirit and scope of the invention, which is defined by the appended claims and all equivalents, including claims appended herein upon filing and also those as possibly amended at a later date.

Figure 3:
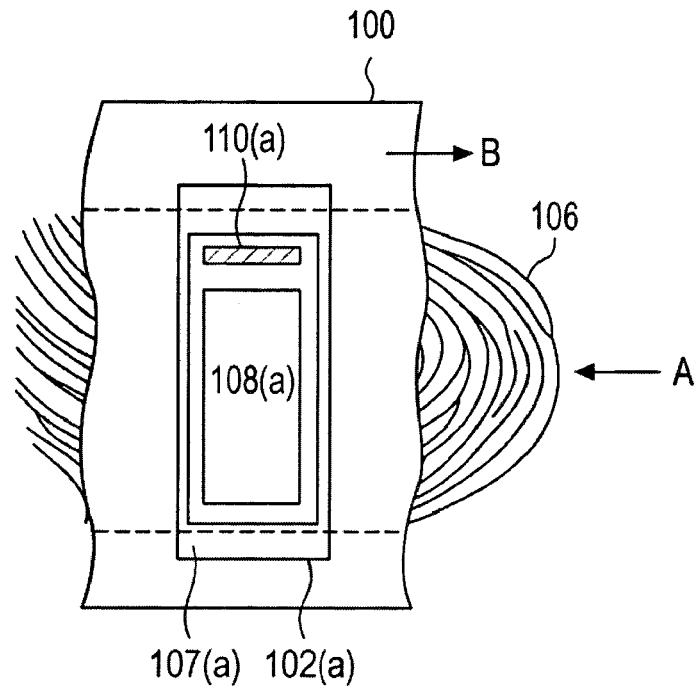
FIG. 3 shows a diagram of one configuration of the sensor during a fingerprint scan, as seen from the underside.

According to another embodiment (102(a)) of the invention illustrated in FIG. 3, the sensor surface (108(a)) may include image sensing elements used for broadly sensing and recording the fingerprint features. In addition, a motion sensor (110(a)) is included for sensing and recording the motion of the fingerprint. Such a device may be a single sensor embedded within the two dimensions of the sensor surface (107(a)), with the fingerprint sensing surface (108(a)) included for sensing and recording the full fingerprint. The motion sensors are configured to separately sense and recording motion information. Here, the sensor surface (107(a)) includes a motion sensor (110(a)) configured separately from fingerprint sensing surface (108(a)). According to this embodiment, the motion sensor is separate from the fingerprint sensing surface, though located on the same sensor surface. In operation, a fingerprint surface (106) can be moved simultaneously along motion sensor (110(a)) and fingerprint sensing surface (108(a)). The motion information from the motion sensor, such as distance and time traveled over that distance, can be utilized together with the fingerprint sensing surface as an aid in reconstructing the separate portions of the fingerprint. As described further below, such a single motion sensor can also be used for navigation functions as well.

Figure 4:
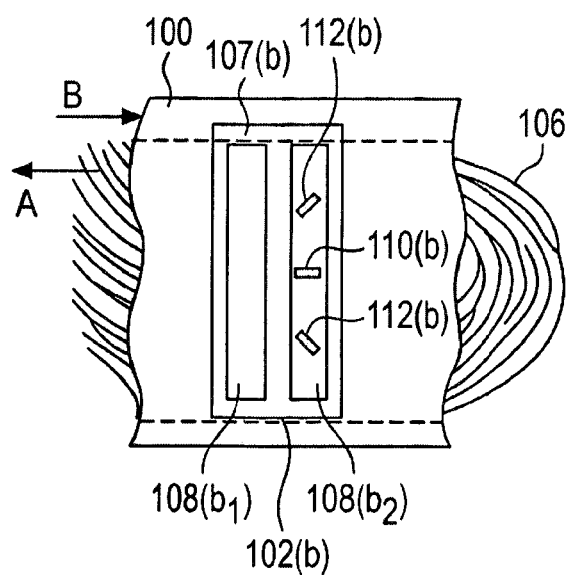
FIG. 4 shows a diagram of an alternative configuration of the sensor during a fingerprint scan, as seen from the underside.

Referring to FIG. 4, another embodiment (102(b)) of the invention is illustrated where motion sensors (110(b)), (112(b)) are located about fingerprint sensor surface (108(b)) within sensor surface (107(b)). The motion sensor (110(b)) is located along an anticipated axis of motion of finger (106) with respect to device (100) in directions A, B. Motion sensor (110(b)) can sense the distance and time expended over that distance to determine velocity, which can be used in reconstructing the fingerprint portions simultaneously captured by fingerprint sensor surface (108(b)). Using the additional motion sensors (112(b)), a fingerprint surface (106) can be sensed and captured even if a user slides the finger at an angle to the axis of the motion sensor (110(b)). In fact, given the angles of the additional sensors (112(b)) with respect to the central axis of the device, the direction of motion can be computed by a processor using vector addition. Thus, the direction, distance and time expended during fingerprint surface travel across the sensors can be used along with the fingerprint portions captured by the fingerprint sensor to accurately reconstruct the fingerprint image. This can be done with a fraction of the processing power, and thus less power source power, than conventional methods and devices known in the prior art. Thus, the invention provides great utility for fingerprint reconstruction and verification for devices that have power and processing restrictions. As described further below, such multiple motion sensors can also be used for navigation functions as well.

Figure 5A:
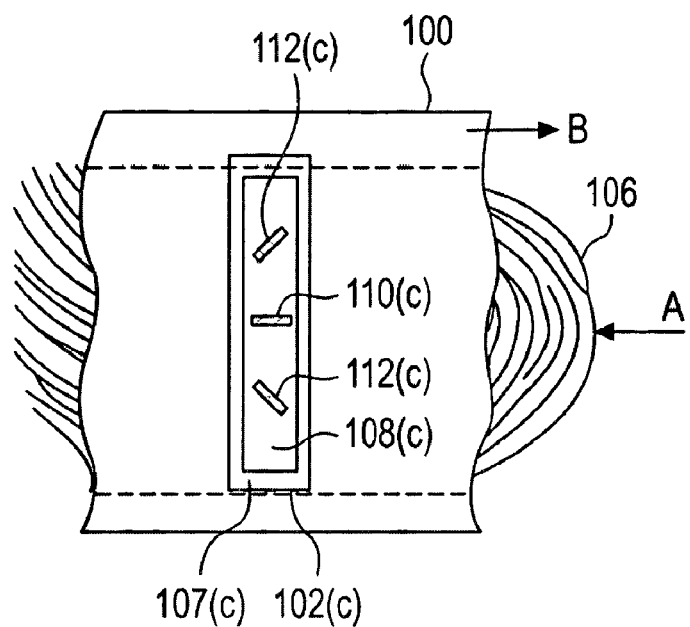
FIG. 5A shows a diagram of an alternative configuration of the sensor during a fingerprint scan, as seen from the underside.
Figure 5B:
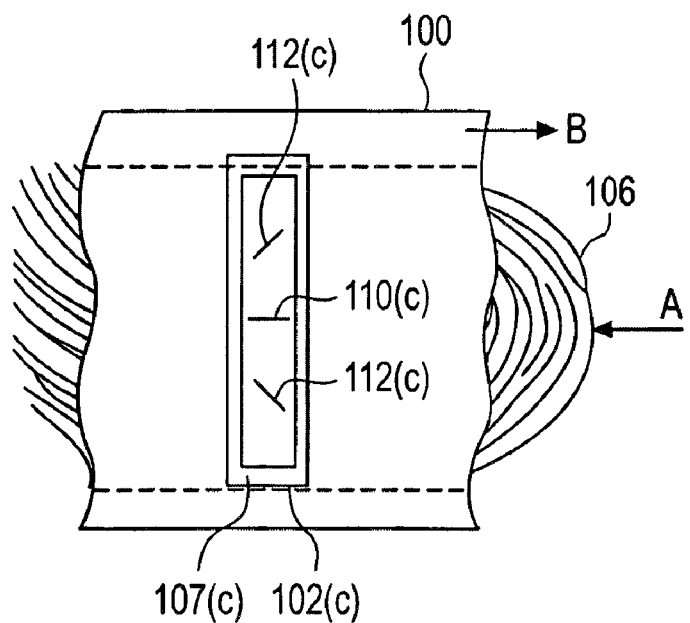
FIG. 5B shows a diagram of an alternative configuration of the sensor during a fingerprint scan, as seen from the underside.

Referring to FIG. 5a, yet another embodiment (102(C)) of the invention is illustrated, where the motion sensors (110(C)), (112(C)) are interleaved with fingerprint sensor surface 108(C) in a combined component within sensor surface (107(C)). Such a configuration can be created in a sensor surface, where the pixels or data contact points that sense the fingerprint features are separately read from the sensors by a processor. For example, in a matrix of sensor pixels or data contact points, individual points can be singled out in one or more arrays to operate as motion sensing arrays. In the same matrix, the remaining pixels or data contact points can form a fingerprint sensor surface for sensing and capturing the fingerprint image. In operation, a fingerprint can be juxtaposed and moved along the sensor surface (107(C)) along the anticipated axis of motion or at another angle, and an accurate sense and capture of a fingerprint can be achieved without undue computation and power load. While the fingerprint sensor surface (108(C)) senses and captures the portions of images of the fingerprint features upon contact with the fingerprint surface (106), the motion sensors can simultaneously capture motion information as the features move past the motion sensors. The motion information can be used in combination with the portions of fingerprint images to reconstruct the fingerprint image. Referring to FIG. 5b, the same configuration of FIG. 5a is illustrated, with a view of the motion sensors shown much smaller in comparison to the overall sensor surface. In a sensor surface that is densely populated with pixels or data contact points, the relative size of the portion of the sensor surface that is covered with the motion sensing arrays are very small compared to the pixels and data points that make up the fingerprint sensing surface (108(C)), both located within sensor surface (107(C)). Thus, the fingerprint can be sensed and captured without any interference by the interleaved motion sensing arrays and accurate portions of a fingerprint image can be captured and accurately reconstructed using the combined information from the fingerprint sensors and the motion sensors. Utilizing this embodiment, a universal component can be constructed and utilized for both motion detection and fingerprint capture, and the results from both functions can be utilized to produce an efficient and power thrifty method of sensing, reconstructing and verifying a fingerprint. These motion sensors, which can sense both motion and direction, can also be used for navigation operations.

Figure 6:
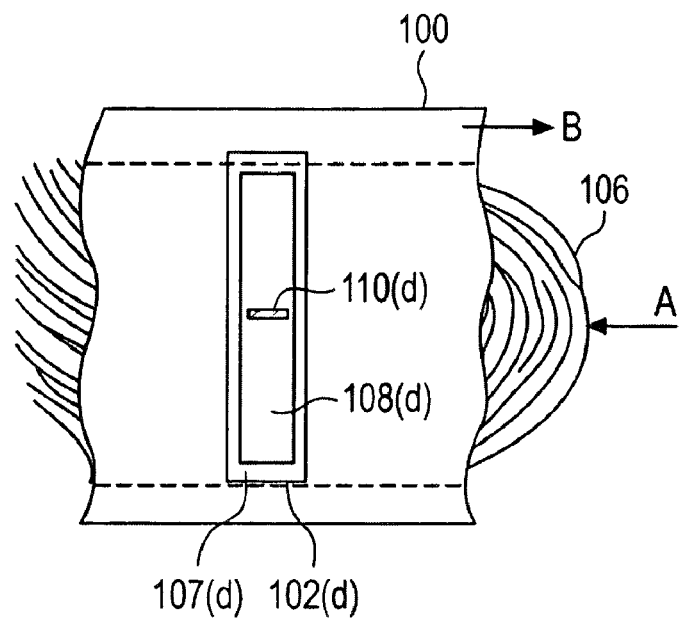
FIG. 6 shows a diagram of an alternative configuration of the sensor during a fingerprint scan, as seen from the underside.

Referring to FIG. 6, another embodiment (102(d)) of the invention is illustrated, where a single motion sensor array (110(d)) is interleaved within the fingerprint sensor surface (108(d)) of sensor surface (107(d)). Unlike the embodiment illustrated in FIGS. 5a, 5b, this embodiment is limited to one motion sensor array located along the anticipated axis of motion of the finger, which is anticipated to move in directions A, B with respect to the device (100). In operation, the interleaved sensor array (110(d)) can sense and capture motion information regarding the motion of the finger across the sensor surface (107(d)), while simultaneously fingerprint sensor surface (108(d)) can sense and capture the fingerprint images for subsequent reconstruction. The information from both sensors can be used to more accurately reconstruct the fingerprint image. The information of both motion and direction can also be used for navigation operations.

Figure 7:
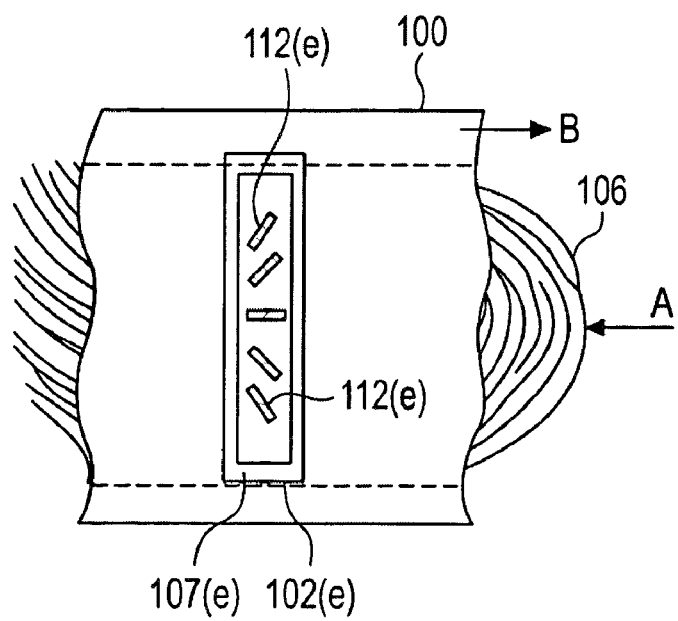
FIG. 7 shows a diagram of an alternative configuration of the sensor during a fingerprint scan, as seen from the underside.

Referring to FIG. 7, yet another embodiment (102(e)) of the invention is illustrated, where multiple motion sensors (112(e)) are interleaved within fingerprint sensor surface (108(e)). This embodiment is similar to that illustrated in FIGS. 5a, 5b, but with more motion sensors at various angles. In operation, a fingerprint can be juxtaposed and moved along the sensor surface (107(e)) along the anticipated axis of motion or at another angle, and an accurate sense and capture of a fingerprint can be achieved without undue computation and power load. While the fingerprint sensor surface (108(e)) senses and captures the portions of images of the fingerprint features upon contact with the fingerprint surface (106), the motion sensors can simultaneously capture motion information as the features move past the motion sensors. The motion information can be used in combination with the portions of fingerprint images to reconstruct the fingerprint image. Those skilled in the art will understand that many variations on the concept of multiple motion sensors embedded or interleaved within the sensor surface are possible, and that different applications will have varying demands for the different sensor features. The information of both motion and direction can also be used for navigation operations.

If used for navigation purposes, of the motion sensor configurations above can be utilized for different navigation operations. For example, referring again to FIG. 3, the motion sensor (110(a)) can be utilized on its own to sense motion in one axis of motion, for example in one direction. One application may be a sensor used for a power, volume or other audio control, where an up or down motion can be used to adjust the power, volume or other audio value. Another application for the invention is the implementation of a scroll function for lists of data or text in a GUI. Precise power control over a range may be useful in manufacturing environments, where small changes in power can greatly affect a process. Another application may be to operate a medical instrument where accuracy is useful to the device's operation.

Navigation can be most useful in two dimensional space, where motion and direction information are required. In prior art motion sensors, only one-directional motion can be detected, and, as discussed above, even the most basic motion detection requires a large amount of computation and processing resources. According to the invention, a navigation sensor can be configured to sense motion and direction. The motion and direction information can then be processed for use in various navigation operations for devices, such as to operate as a computer mouse for example. Referring again to FIG. 4, a separate motion sensor (110(b)) is illustrated for individual sensing of motion and direction, where distance, time expended over the distance (allowing for calculation of velocity), and direction can be calculated. Though this motion information can be used to enable better processing and reconstruction of fingerprint images as discussed above, it can be used separately for navigation, making it a navigation sensor. In operation, the separate motion sensor can detect motion and direction, giving information required for navigation functions. In operation, a navigation sensor can consistently computing the matches for the various axes, generating motion and direction information as a fingerprint moves about a sensor.

Thus, if a user would stroke a fingerprint surface against a motion sensor surface, the arrays could pick up the motion and direction information, and a processor could process the information to generate relative motion and direction information for use in navigation, such as for a computer mouse. In this example, a user can move a finger relative to a cursor on a graphical user interface (GUI), such as a computer screen, a cellular phone, a personal data assistant (PDA) or other personal device. The navigation sensor could then cause the cursor to move relative to the fingerprint motion, and a user can navigate across the GUI to operate functions on a computer or other device. Since the motion of the cursor is relative to the movement of the fingerprint surface against the navigation sensor, relatively small movements can translate to equal, lesser or even greater distance movement of the cursor.

One aspect of the invention that is very useful to navigation configurations is the ability to consistently generate a motion result. As discussed above, the invention provides a means to substantially ensure a result when a fingerprint moves across a motion sensor. This is true for single array motion sensors as well as multiple array sensors used for two-dimensional motion processing. In a navigation application, such a configuration can provide accurate and consistent motion and directional information that allows for smooth and reliable navigational operations.

Figure 8:
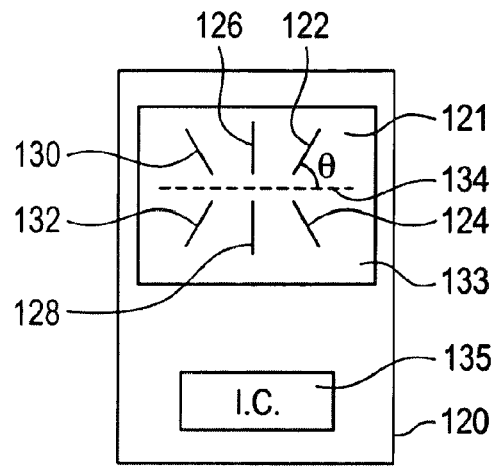
FIG. 8 is a diagrammatic view of a sensor configured according to the invention.

Referring to FIG. 8, another embodiment of the invention is illustrated, where multiple arrays are located on the sensor surface to allow for sensing and capturing motion and direction information in different directions of fingerprint travel for use in navigation applications and other applications. The base film (120), which as previously discussed may be a dielectric thin film such as polyimide film, Kapton tape, cellulose triacetate film, polyester film, or other material, includes a sensor surface (121) having several motion sensor arrays. Similar to the three sensor array illustrated in FIG. 5A, there are three sensors that fan upward for detecting motion and direction. In operation, a user typically will stroke over the sensor in a downward direction, and the three sensors can determine the direction and speed using vector analysis. However, it may be desired to account for motion in either an upward or downward direction, and multiple sensors in either direction would be useful to better capture the information. From an orientation of a user facing the sensor illustrated in FIG. 8, the right sensors (122), (124) face the right, and are configured to capture movement toward the right, where either sensor could capture movement motion from the upper right to the lower left, and from the upper left to the lower right. Sensors (126), (128) could capture up or down movement, and sensors (130), (132) face the left, and are configured to capture movement toward the right, where either sensor could capture movement motion from the upper right to the lower left. Utilizing the multiple sensors, a sensor would be more robust, capable of sensing more fingerprint features, and also able to process more movement and directional information for use in capturing and reconstructing fingerprint images or for other applications such as navigation. The angle $\theta$ occurring between sensor (121) and center horizontal line (134) can be any angle, such as 30, 45 or 22.5 degrees in order to most effectively capture movement that is not aligned with center sensors (126), (128). All off-axis sensors (124), (128), (130), (132) can be set at various angles, which can depend on a particular application.

Figure 9:
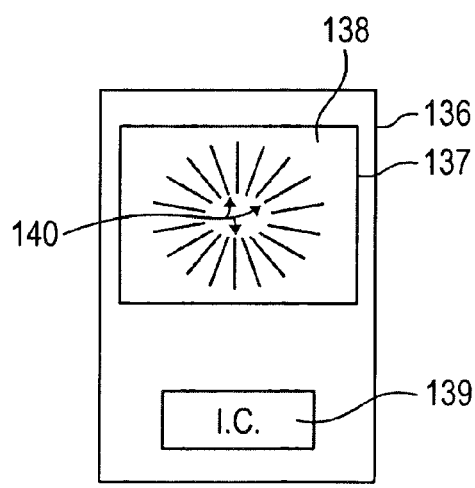
FIG. 9 is a diagrammatic view of a sensor configured according to the invention.

Referring to FIG. 9, an even more robust example of a sensor set on film (136) having a surface (137) located on the Kapton tape or film. The sensor (138) is located on the film surface (137), and includes multiple array sensors (140) that are set at various angles. In this embodiment, each array may be set at 22.5 degrees from adjacent angles, providing a wide variety of angles at which to sense and capture motion information. The sensor, similar to that of FIGS. 8 and 2B, has an IC chip (139) that is separate from the sensor surface (138).

Figure 10:
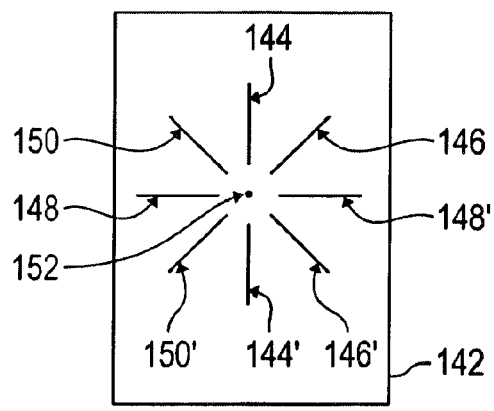
FIG. 10 is a diagrammatic view of a sensor configured according to the invention.

Referring to FIG. 10, a diagrammatic view of multiple array sensors located on a sensor (142) is illustrated. Sensors (144), (144') are vertical arrays that are set to capture one axis of motion. Sensors (146), (146') and (150), (150') are located off axis at an angle to sensors (144), (144'). Sensors (148), (148') are optional and may be used in conjunction with the other sensors to gather motion information in a horizontal direction with respect to the vertical sensors. In practice, either or all of these sensors can be utilized by a system to accurately sense and capture motion and direction information in multiple directions. Again, which sensors to use may depend on a particular application and configuration.

In one embodiment, in order to support motion at any arbitrary angle, sensor arrays may be oriented at approximately 0, 30, 60, 90, 120, and 150 degrees. Another more robust system might space them at 22.5 degree increments, rather than 30. Once motion reaches 180 degrees, the process can use reverse motion on the zero degree sensor array, and so on. A device configured in this way would have some of the properties of a navigation touchpad such as those used in laptop computers, with the relative motion sensing capability of a computer mouse.

Circuitry, Programs, and Algorithms Used in the Device

For detailed information pertaining to the principles, the driver circuitry and electronics used for the deep finger penetrating radio frequency (RF) based embodiment of the present invention operate, please refer to U.S. Pat. Nos. 7,099, 496; 7,146,024; and patent applications US 2005-0235470 A1; US 2005-0244039 A1; US 2006-0083411 A1; US 2007-0031011 A1, incorporated herein by reference. The present discussion is not limited to such deep finger penetrating radio frequency (RF) based sensors, but is applicable to electrical sensing methods in general.

Figure 11A:
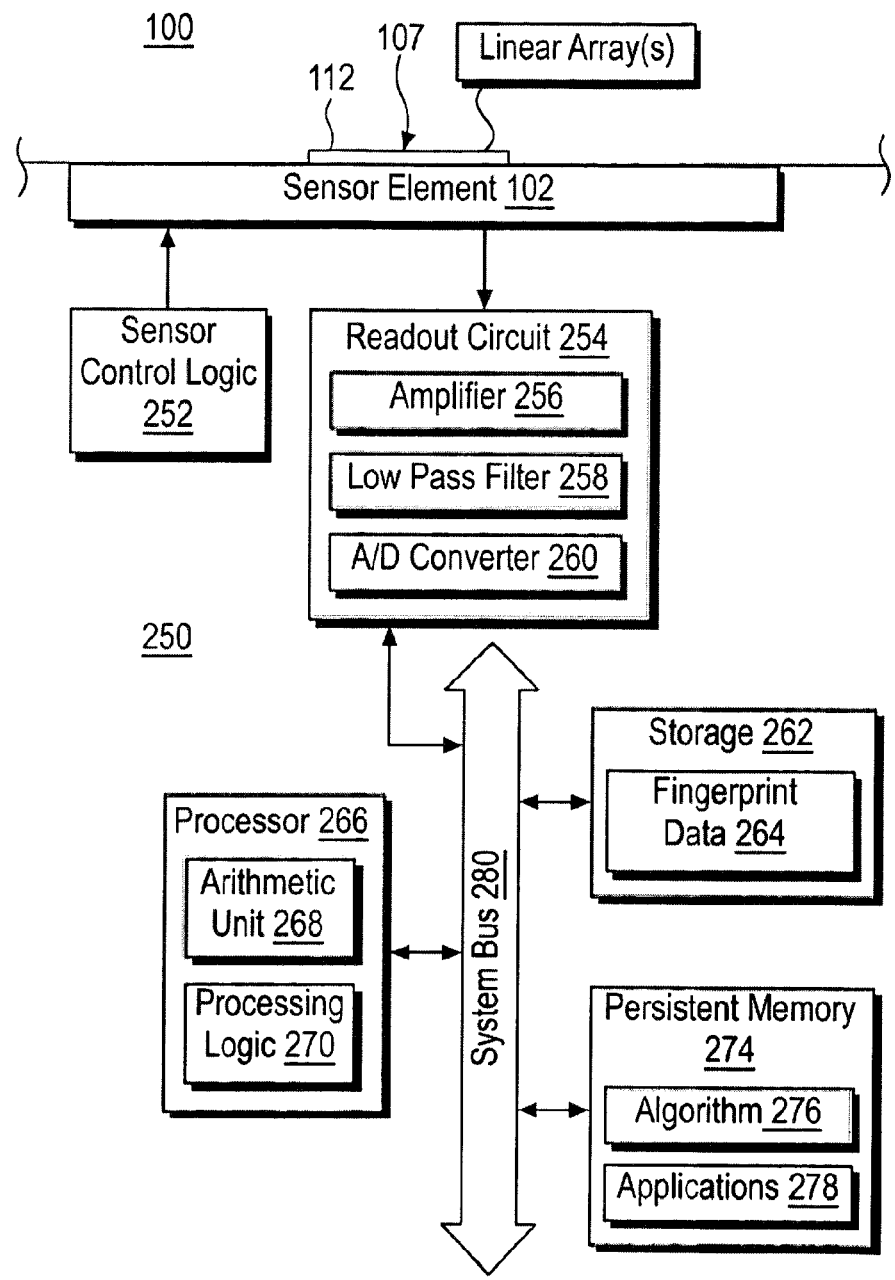
FIG. 11A shows some of the circuitry and software used to drive the sensor.

Referring to FIG. 11A, a diagrammatic view of the circuitry behind sensing device (100) configured according to the invention is illustrated. The device includes a linear array (112) such as described in the embodiments above, and also includes a sensor element (102) also discussed above. The device further includes sensor control circuits and logic (252) configured to control the basic operations of the sensor element. The exact operations of the sensor element governed by the sensor logic control greatly depends on a particular sensor configuration employed, which may include such as power control, reset control of the pixels or data contact points, output signal control, cooling control in the case of some optical sensors, and other basic controls of a sensor element. Sensor controls are well known by those skilled in the art, and, again, depend on the particular operation. The device further includes a readout circuit (254) for reading analog output signals from the sensor element when it is subject to a fingerprint juxtaposed on the sensor surface (107). The readout circuit includes an amplifier (256) configured to amplify the analog signal so that it can more accurately be read in subsequent operations. Low pass filter (258) is configured to filter out any noise from the analog signal so that the analog signal can be more efficiently processed. The readout circuit further includes an analog to digital converter (260) that is configured to convert the output signal from the sensor element to a digital signal that indicates a series of logic 0's and 1's that define the sensing of the fingerprint features by the pixels or data contact points of the sensor surface (107). Such signals may be separately received by the motion sensors and the fingerprint sensing surfaces as discussed in the embodiments above, and may be read out and processed separately. The readout circuit may store the output signal in storage (262), where fingerprint data (264) is stored and preserved, either temporarily until the processor (266) can process the signal or for later use by the processor. The processor (216) includes arithmetic unit (268) configured to process algorithms used for navigation of a cursor, such as that described in connection with navigation features of FIG. 2b, and for reconstruction of fingerprints. Processing logic (270) is configured to process information and includes analog to digital converters, amplifiers, signal filters, logic gates (all not shown) and other logic utilized by a processor. Persistent memory (274) is used to store algorithms (276) and software applications (278) that are used by the processor for the various functions described above, and in more detail below. The system bus (280) is a data bus configured to enable communication among the various components in the system (100).

Figure 11B:
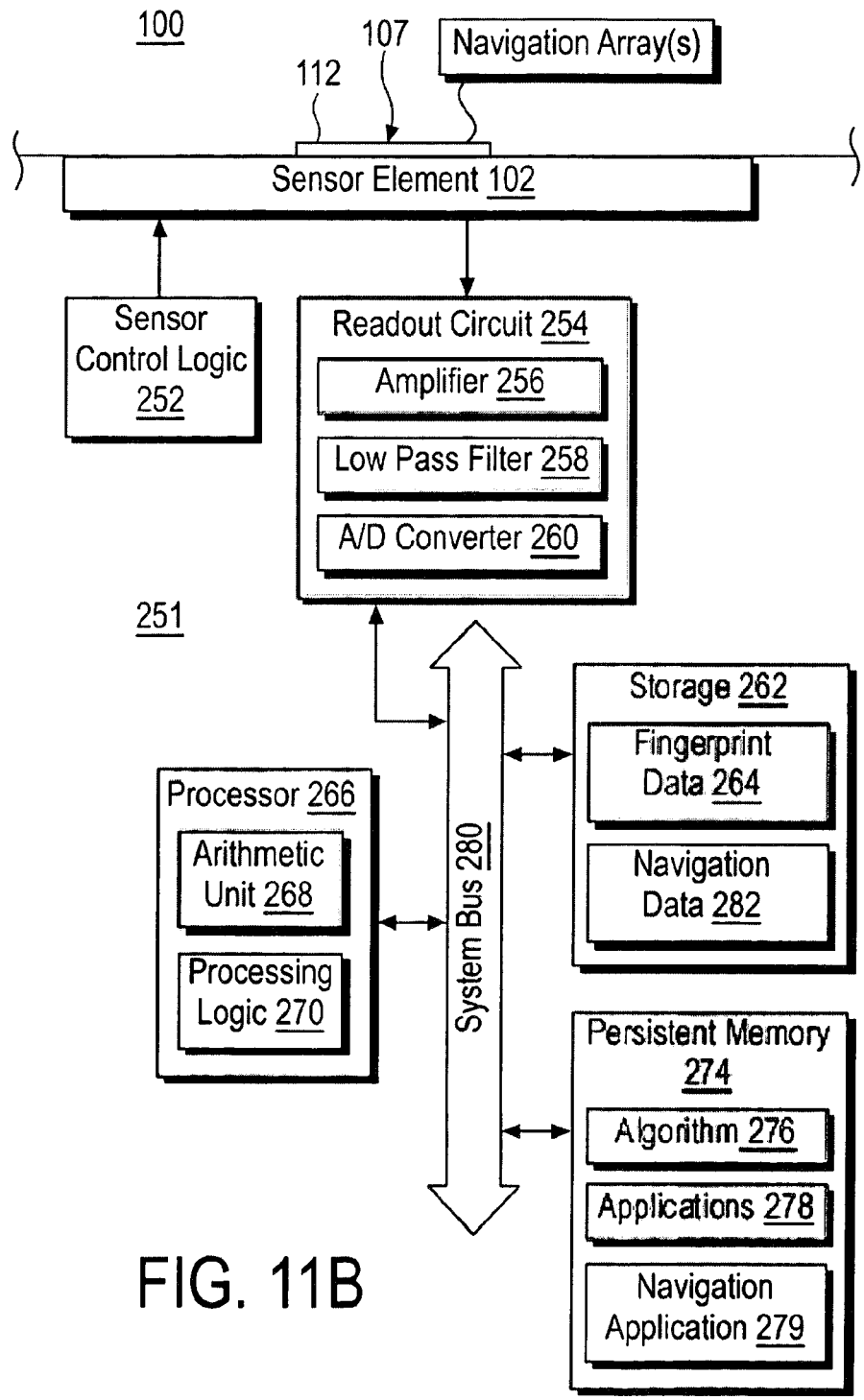
FIG. 11B shows some of the circuitry and software used to drive the fingerprint navigation functionality of the sensor.

Referring to FIG. 11B, another diagram of the circuitry and software used to capture and process navigation information is shown. The device (100) includes a linear navigation array (s) (112) such as described in the embodiments above, and also includes a sensor element (102) also discussed above. The surface may include a single array for one-dimensional navigation capabilities, or may include multiple arrays for capturing both motion and directional information for use in navigation applications. The device further includes sensor control circuits and logic (252) configured to control the basic operations of the sensor element. The exact operations of the sensor element governed by the sensor logic control greatly depends on a particular sensor configuration employed, which may include such as power control, reset control of the pixels or data contact points, output signal control, cooling control in the case of some optical sensors, and other basic controls of a sensor element. Sensor controls are well known by those skilled in the art, and, again, depend on the particular operation. The device further includes a readout circuit (254) for reading analog output signals from the sensor element when it is subject to a fingerprint juxtaposed on the sensor surface (107). The readout circuit includes an amplifier (256) configured to amplify the analog signal so that that it can more accurately be read in subsequent operations. Low pass filter (258) is configured to filter out any noise from the analog signal so that the analog signal can be more efficiently processed. The readout circuit further includes an analog to digital converter (260) that is configured to convert the output signal from the sensor element to a digital signal that indicates a series of logic 0's and 1's that define the sensing of the fingerprint features by the pixels or data contact points of the sensor surface (107). Such signals may be separately received by the motion sensors and the fingerprint sensing surfaces as discussed in the embodiments above, and may be read out and processed separately. The readout circuit may store the output signal in storage (262), where fingerprint data (264) is stored and preserved. Navigation data (282) may also be stored in storage (262) for use according to the invention. This may be stored either temporarily until the processor (266) can process the signal, or for later use by the processor. The processor (216) includes arithmetic unit (268) configured to process algorithms used for navigation of a cursor, such as that described in connection with navigation features of FIG. 2*b*, and for reconstruction of fingerprints. Processing logic (270) is configured to process information and includes analog to digital converters, amplifiers, signal filters, logic gates (all not shown) and other logic utilized by a processor. Persistent memory (274) is used to store algorithms (276), software applications (278) and navigation software application (279) that is used by the processor for the various functions described herein. The system bus (280) is a data bus configured to enable communication among the various components in the system (100).

In one embodiment, fingerprint image data is converted into motion data according to the following scheme. In this scheme, a linear sensor array (such as a deep finger penetrating radio frequency (RF) based array, or an optical array, etc.) is disposed along a probable direction of finger motion. This sensor array is comprised of a number of imaging pixel elements arranged along the axis of motion of the finger with a sufficient pixel density to resolve fingerprint ridges and valleys, typically 250-500 dpi. The pixels may sense the presence or absence of the fingerprint ridge through a variety of techniques, such as capacitance, optical imaging, or mechanical pressure. The array of imaging pixels is sampled at a predetermined rate, sufficient to ensure that the finger will not travel more than about two pixels in a sample period. Any reasonable time period could be set, but one example is 500 usec. In this embodiment, the pixels are configured as a single extended array, and software may subdivide the larger array into a number of potentially overlapping windows.

At each sample time, the state of the sense elements is converted to a series of numerical values. Because earlier and later image samples are taken along the axis of finger motion at different times, the images will generally appear similar if they are sequentially shifted and compared against each other until a match is found. Depending upon the speed of the finger, the distance required for a match will differ, larger finger speeds requiring a greater distance shift. Thus for an absolute distance of motion D in the period between the samples T, the direct finger velocity measurement will be D/T.

Unlike prior art systems and methods, the system does not have to accumulate a large time history when no motion is detected between different fingerprint images taken at different times. The system can simply store or maintain the first fingerprint image (sample) and perform a new computation when the next sample is acquired. This is advantageous in the case where there is no prior knowledge of the approximate velocity speed of the finger. Often in practice, the finger velocity relative to the sensory surface may vary greatly. The invention eliminates the need for a large buffer of samples to cover a wide dynamic range of finger speeds.

A further advantage offered by the invention is the ability to adjust the sample rate (i.e. the time lapse between acquiring successive fingerprint images) as a function of the rate of motion of the finger. Thus the measurement system may adjust the sample rate to optimize the distance traveled when looking for a match between two successive fingerprint images (frames). For example, if the criterion is that a displacement of 10 pixels between successive images is optimal for determining fast moving fingers, then the time period between acquiring successive images can be adjusted accordingly. This is similar to a "coarse" adjust in that if a mouse cursor on a display screen is coupled to this device, the mouse will move very quickly (i.e. from one side of the screen to the other) but not very precisely. Conversely, as the finger velocity decreases, it is likely that the user wishes to control the mouse very precisely, as for example when a cursor on a screen is approaching the final destination desired by the user. Here, the system can shift to a "fine adjust" mode by changing the time and pixel displacement criteria. For fine adjust mode, the system might determine that the optimum pixel displacement to look for is on the order of a single pixel, and adjust the time difference between measurements to optimize for this result.

Those skilled in the art will understand that there are various methods for changing the sample rate in order to achieve these and other objectives, and the invention is not limited to any particular method, and moreover is inclusive of the various known methods as well as methods readily ascertainable by one skilled in the art without undue experimentation.

Usually, finger motion will not exactly coincide with the direction of a particular linear array or partial fingerprint imager. Usually it will be somewhat of the sensor axis. To capture this, multiple sensors each aligned with a different axis, will be used. Consider a two motion sensor unit, where each sensor has an axis 90° off from the other. In the typical case where finger motion lies between the two axes, the distance a fingerprint feature travels along each sensor array will be less than the entire length of the sensor.

Often multiple (more than two) arrays will be used, each with an axis at a different angle. To detect motion across a range of angles, sensor arrays may be provided at a series of angles disposed so that a match will be found on at least two of the sensor arrays. For example, by arranging the arrays in 30 degree increments across the allowable range of motion axes, it is possible to ensure that if there is worst case alignment (i.e. a 15 degree misalignment between the actual axis of motion an the two sensor arrays on either side of it), an image feature will still approximately follow the nearest sensor arrays for more than three pixels of travel. Thus, by sampling the sensor arrays fast enough to ensure that the finger has not traveled more than three pixels between samples, it is possible to determine the axis of motion by finding the adjacent pair of sensors with the highest correlation, and computing the vector sum of the distances traveled along each of them.

Figure 12:
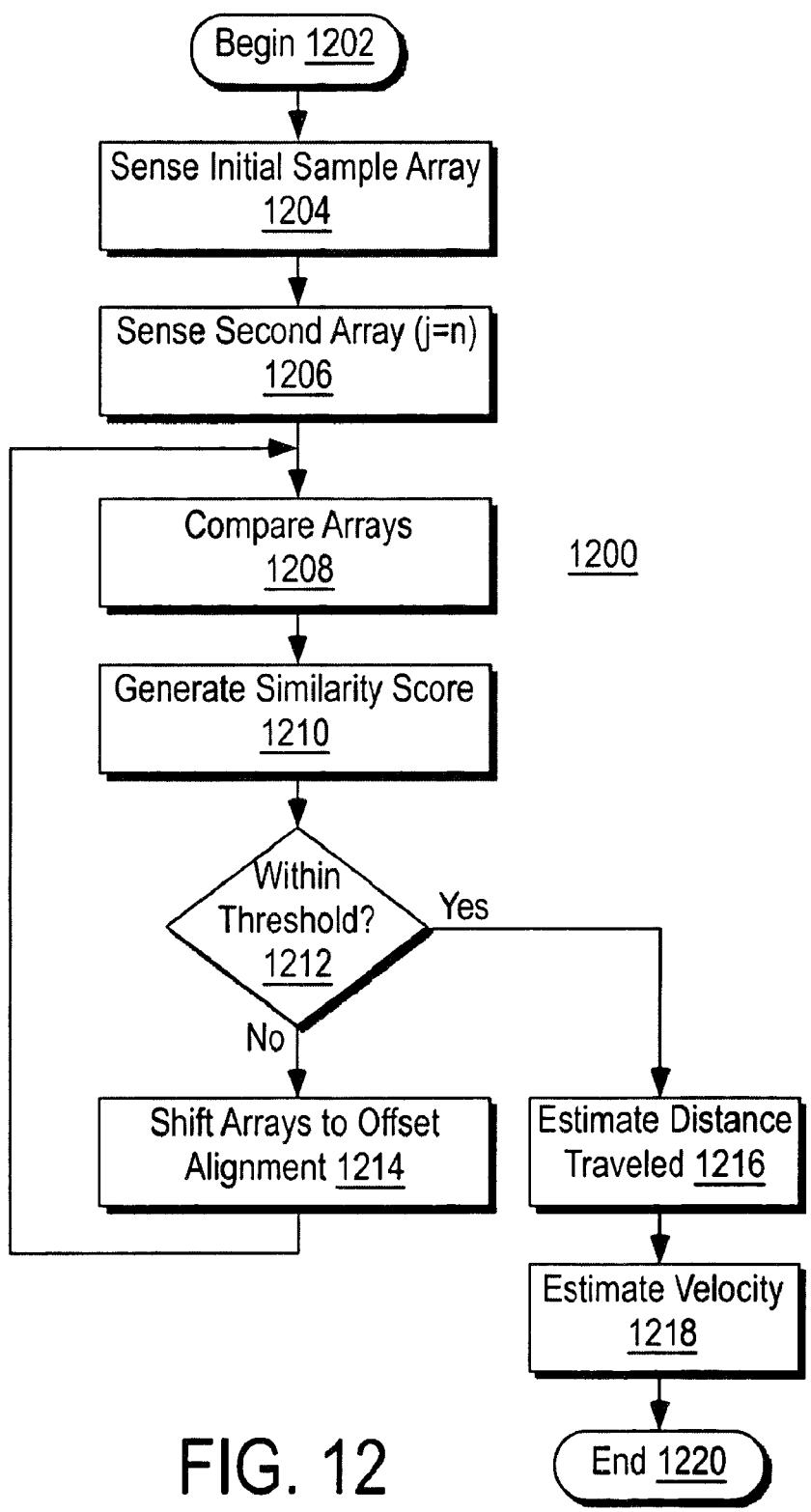
FIG. 12 is a flow diagram showing some of the steps involved in one possible finger speed determination algorithm.

Referring to FIG. 12, a flow chart (1200) is illustrated that shows one embodiment of a motion sensor program, algorithm, or process that can be used for simply detecting and sensing motion, in conjunction with an image sensor for use in reconstructing a fingerprint image, for use in navigation applications or other applications where accurate motion sensing is desired. The process begins at step (1202). In step (1204), an initial sample array of a fingerprint is sensed. In step (1204), a second sample array is sensed after a period of time, t=n. The arrays are converted into a digital representation of the array of fingerprint sensors, and a digital string of digital ones and zeros is used by a processor to determine the relative movement between the two samplings. In practice, a predetermined period of time can be selected, or it can alternatively be measured, where time is measured between the first and second samples. In either case, once the distance is determined between the two samples, assuming that movement has occurred, velocity can be calculated using the distance traveled divided by the time expended during such travel. Continuing, in step (1208), the two arrays are compared. In an initial alignment, the arrays are compared side by side. If this comparison shows a high correlation, then it is indicative of no relative motion between the fingerprint and the motion sensor.

In step (1210), a similarity score is generated, defining the amount of correlation between the two arrays. This may be in the form of a probability value, a percentage correlation value, or other mathematical value that can be used by the processor to determine the best similarity score among different comparisons. In step (1212), it is determine whether the similarity score falls within a threshold. In one embodiment, the threshold is a predetermined number that is decided according to a particular application. In practice, the invention can be configured to produce correlations that are of a high value, thus justifying a high threshold. Those skilled in the art will understand that such a threshold can be determined without undue experimentation, and that is depends on an application. If the score does not fall within the threshold, then the arrays are shifted to offset alignment in step (1214). The direction of the shifting may be done according to a predicted direction that a user would be expected to move the fingerprint surface across the sensor. If it is not known, or if the design calls for either direction, then flexibility can be accommodated by shifting the arrays in multiple directions until an alignment is reached that is within the threshold. In either case, the process returns to step (1208), where the arrays are compared again. A new similarity score is generated in step (1210), and the new score is measured against the threshold. This process can be reiterated until a score passes the threshold, and could possibly register an error if one is not met over time or a predetermined number of cycles. In a practical application, the two arrays can be shifted and processed once for each pixel in one array, since they are equal in length given that they were taken from the same array. If a score occurs that is within the threshold, then the distance is estimated in step (1216). This can be done by simply counting the number of pixels in which the arrays were shifted before a score occurs within the threshold, and multiplying this number by the distance between pixels, which can be estimated to be the distance between midpoints of two pixels. The distance can be accurately measured by sampling distances between individual pixels and groups of pixels in an array, but the exact method of measurement would depend on the application. Then, the velocity can be estimated in step (1218) by dividing the distance traveled by the time expended during the travel. The process ends at step (1220), where an estimated velocity value can be generated.

Often the process shown in FIG. 12 as well as FIGS. 13-16) will be implemented as a series of software steps performed by a microprocessor. A wide variety of different microprocessors may be used for this purposes, including 8051, ARM, MIPS, X86, MSP430 and other microprocessors commonly used for such purposes. In some embodiments, it may be convenient to embed the core of this processor (or processors) onto one or more of the integrated circuit chips (168), (170), (172) used to drive the sensor. In other embodiments, it may be convenient to send the raw data off the sensor via the I/O connectors (168), (171), (173) and perform these steps on a microprocessor or other circuitry located elsewhere. In either event, the steps shown in FIGS. 12-16 may be viewed as the steps or operations that are performed by the microprocessor (s) and suitable driver software.

Figure 13:
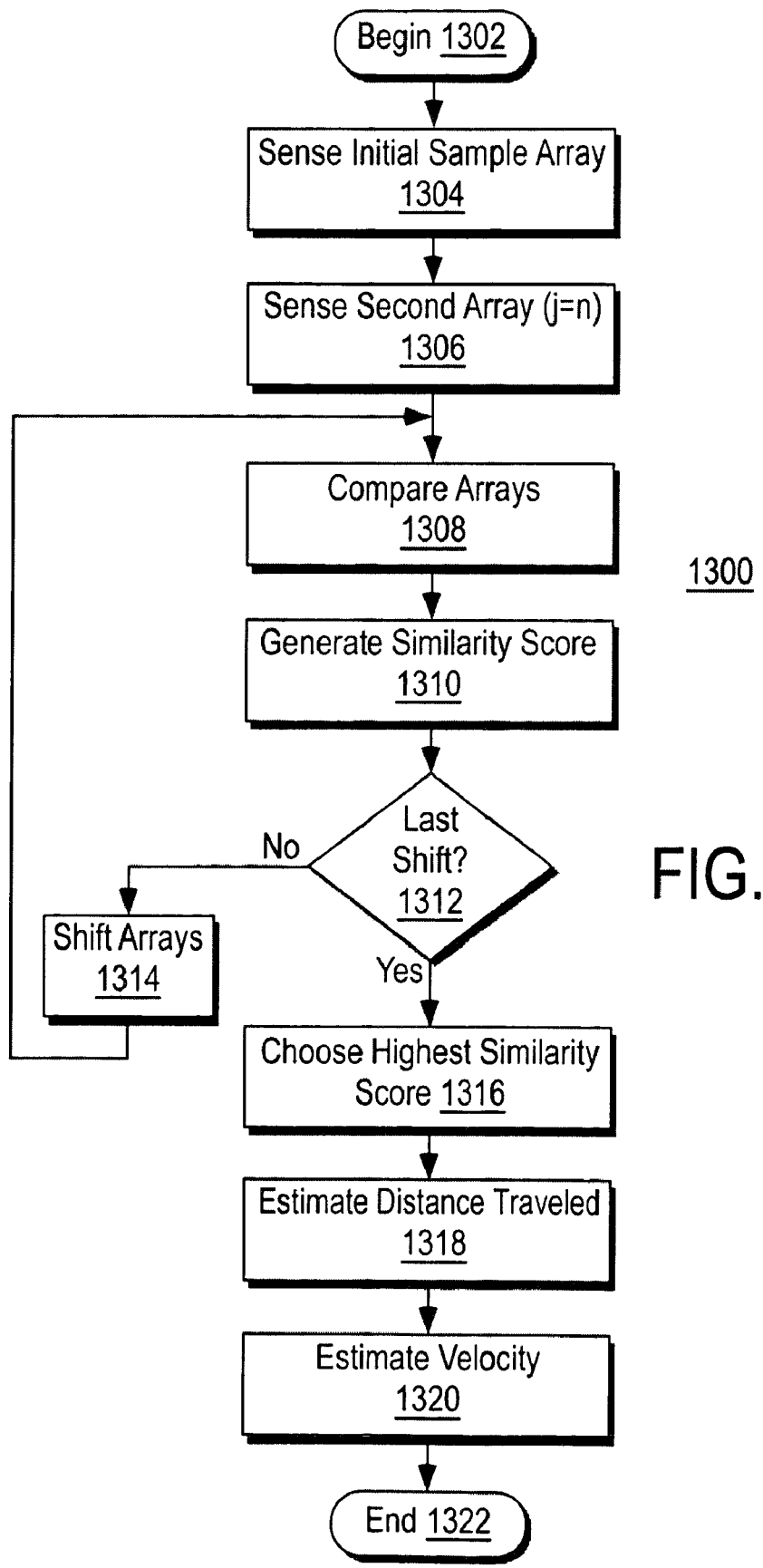
FIG. 13 is a flow diagram showing some of the steps involved in one possible partial fingerprint (array) comparison algorithm.

Referring to FIG. 13, another flow chart (1300) is illustrated that shows one embodiment of a motion sensor process that can be used for simply detecting and sensing motion, in conjunction with an image sensor for use in reconstructing a fingerprint image, for use in navigation applications or other applications where accurate motion sensing is desired. The process begins at step (1302). In step (1304), an initial sample array of a fingerprint is sensed. In step (1304), a second sample array is sensed after a period of time, t=n. The arrays are converted into a digital representation of the array of fingerprint sensors, and a digital string of digital ones and zeros is used by a processor to determine the relative movement between the two samplings. In practice, a predetermined period of time can be selected, or it can alternatively be measured, where time is measured between the first and second samples. In either case, once the distance is determined between the two samples, assuming that movement has occurred, velocity can be calculated using the distance traveled divided by the time expended during such travel.

Continuing, in step (1308), the two arrays are compared. In an initial alignment, referring briefly to FIG. 10, the arrays are compared side by side. If this comparison shows a high correlation, then it is indicative of no relative motion between the fingerprint and the motion sensor. In step (1310), a similarity score is generated, defining the amount of correlation between the two arrays. This may be in the form of a probability value, a percentage correlation value, or other mathematical value that can be used by the processor to determine the best similarity score among different comparisons. In step (1312), it is determine whether the shift is a last shift in a predetermined number of shifts. In practice, it is practical to shift at least the number of pixels in the array sensor, since both image arrays are sensed and sampled by the same sensor array. Again, similar to the process invention embodied in FIG. 12, the direction of the shifting may be done according to a predicted direction that a user would be expected to move the fingerprint surface across the sensor. If it is not known, or if the design calls for either direction, then flexibility can be accommodated by shifting the arrays in multiple directions until an alignment is reached that is within the threshold. If it is not the last shift, then the array is shifted in step (1314), and the process returns to step (1308), where the arrays are again compared, a new score is generated in step (1310), and it is again queried whether it is the last shift. If it is the last shift, then the highest similarity score is chosen in step (1316).

Then the distance is estimated in step (1318). Again, this can be done by simply counting the number of pixels in which the arrays were shifted, and multiplying this number by the distance between pixels, which can be estimated to be the distance between midpoints of two pixels. The distance can be accurately measured by sampling distances between individual pixels and groups of pixels in an array, but the exact method of measurement would depend on the application. Then, the velocity can be estimated in step (1320) by dividing the distance traveled by the time expended during the travel. The process ends in step (1322) where a velocity value can be generated.

Figure 14:
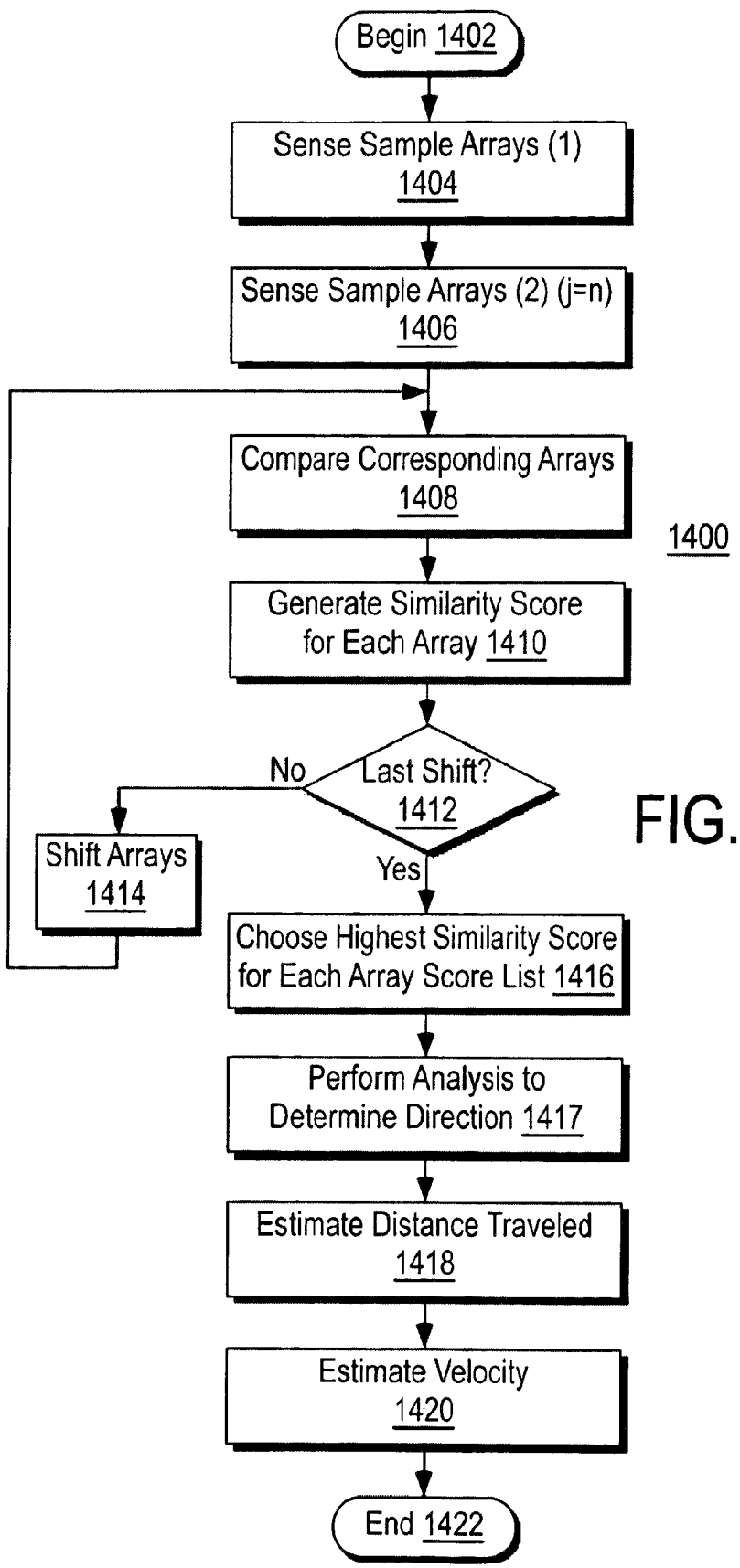
FIG. 14 is a further detail showing how comparing similarity between partial fingerprint images (arrays) may be used to determine finger velocity.

Referring to FIG. 14, a flow chart of another embodiment of a navigation sensor operation is illustrated, where multiple sensors are used to produce navigation information from a navigation sensor. The process begins Referring to FIG. 14, another flow chart (1400) is illustrated that shows one embodiment of a motion sensor program, algorithm or process that can be used for simply detecting and sensing motion, in conjunction with an image sensor for use in reconstructing a fingerprint image, for use in navigation applications or other applications where accurate motion sensing is desired. The process begins at step (1402). In step (1404), initial sample arrays of a fingerprint are sensed. In step (1404), a second set of sample arrays are sensed after a period of time, t=n. The arrays are converted into a digital representation of the array of fingerprint sensors, and a digital string of digital ones and zeros is used by a processor to determine the relative movement between the each of the two samplings from each sensor. In practice, a predetermined period of time can be selected, or it can alternatively be measured, where time is measured between the first and second samples. In either case, once the distance is determined between the two samples, assuming that movement has occurred, velocity can be calculated using the distance traveled divided by the time expended during such travel, and direction can be determined using vector analysis of the several vectors' motion information.

Continuing, in step (1408), the two arrays are compared for each sensor. In an initial alignment, the digital representations of the arrays of features are compared side by side for each sensor array. If this initial comparison shows a high correlation, then it is indicative of no relative motion between the fingerprint and the motion sensor. In step (1410), a similarity score is generated for each array, defining the amount of correlation between the two arrays. This may be in the form of a probability value, a percentage correlation value, or other mathematical value that can be used by the processor to determine the best similarity score among different comparisons. In step (1412), it is determine whether the shift is a last shift in a predetermined number of shifts. In practice, it is practical to shift at least the number of pixels in each of the array sensors, since both image arrays from each sensor is sensed and sampled by the same sensor array. Again, similar to the process invention embodied in FIG. 12, the direction of the shifting may be done according to a predicted direction that a user would be expected to move the fingerprint surface across the sensor. If it is not known, or if the design calls for either direction, then flexibility can be accommodated by shifting the arrays in multiple directions until an alignment is reached that is within the threshold. If it is not the last shift, then the array is shifted in step (1414), and the process returns to step (1408), where the arrays are again compared, a new score is generated in step (1410), and it is again queried whether it is the last shift. If it is the last shift, then the highest similarity score is chosen in step (1416). In step (1417), the predominant direction of motion is determined by selecting the array with the highest similarity score at its local maximum. The arrays adjacent to the array at the predominant motion axis are examined to determine if either their similarity scores exceeds the threshold for a secondary component axis (this threshold is lower than the threshold for the predominant axis).

Then the distance is estimated in step (1418). Again, this can be done by simply counting the number of pixels in which the arrays were shifted, and multiplying this number by the distance between pixels, which can be estimated to be the distance between midpoints of two pixels. The distance can be accurately measured by sampling distances between individual pixels and groups of pixels in an array, but the exact method of measurement would depend on the application.

If the similarity score for either of the adjacent arrays exceeds the threshold and this similarity score occurs at a distance less than the distance traveled on the predominant axis, then the principal axis of motion is assumed to lie between the predominant axis and this second axis. The angle of motion is then estimated by computing the ratio of distances along the predominant and secondary axes. The ratio of these distances is approximately equal to the ratio of the cosines of the angles between the actual axis of motion and the axes of the two sensor arrays.

The final estimated distance is computed by taking the distance measured on the predominant axis sensor and dividing it by the cosine of the difference between the estimated angle of motion and the angle of the sensor axis.

Then, the velocity can be estimated in step (1420) by dividing the distance traveled by the time expended during the travel. The process ends in step (1422) where a velocity value can be generated.

Figure 15:
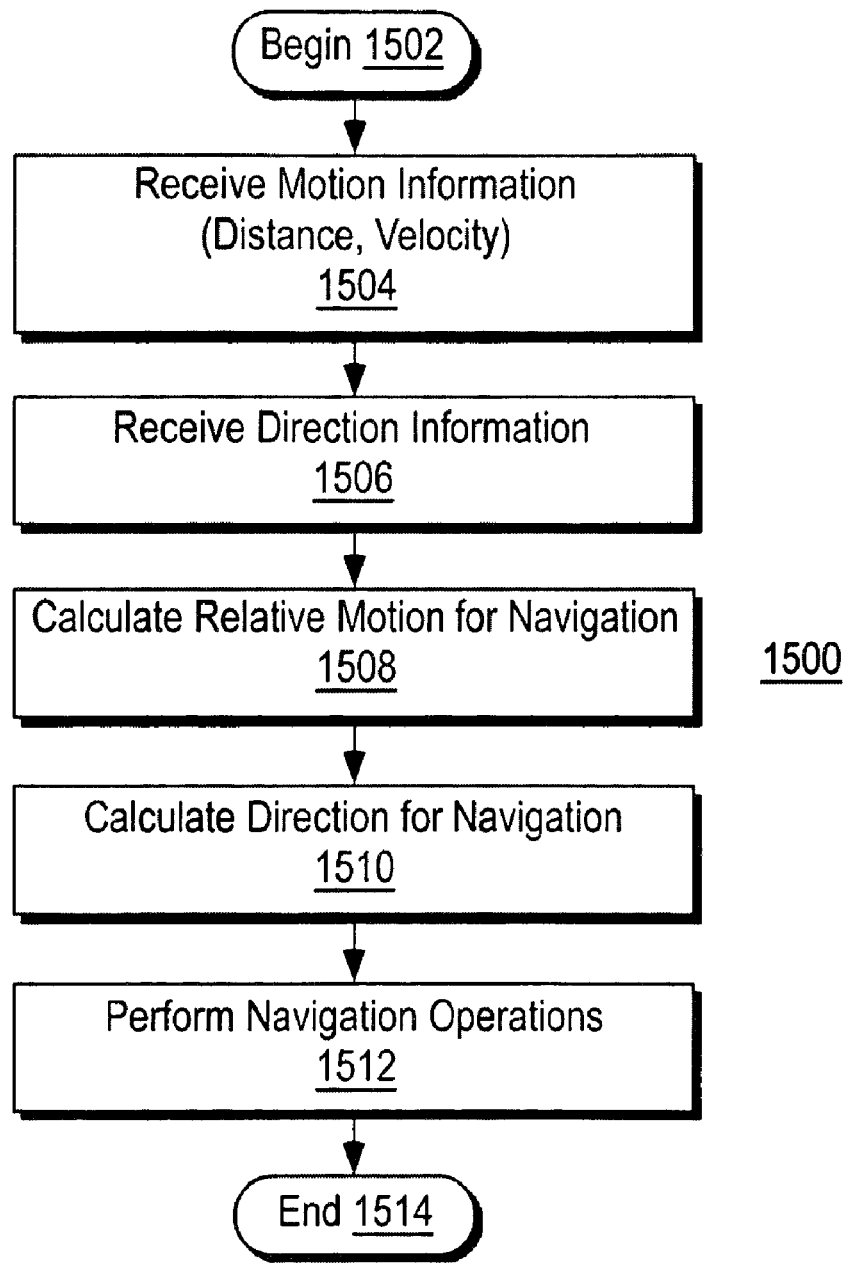
FIG. 15 is a flow diagram showing how finger velocity from various sensors may be combined to determine finger motion for navigation purposes, and then used to control a device.

Referring to FIG. 15, a flow chart (1500) of one embodiment of a navigation sensor operation is illustrated. The program, algorithm, or process begins at step (1502), and, in step (1504), motion information is received, such as distance, time and velocity information. In step (1506), direction information is received from the sensors. In step (1508), relative motion for navigation is calculated by a processor. In step (1510), direction information for navigation is calculated. And, in step (1512), navigation operations are performed. The process ends at step (1514).

Figure 16:
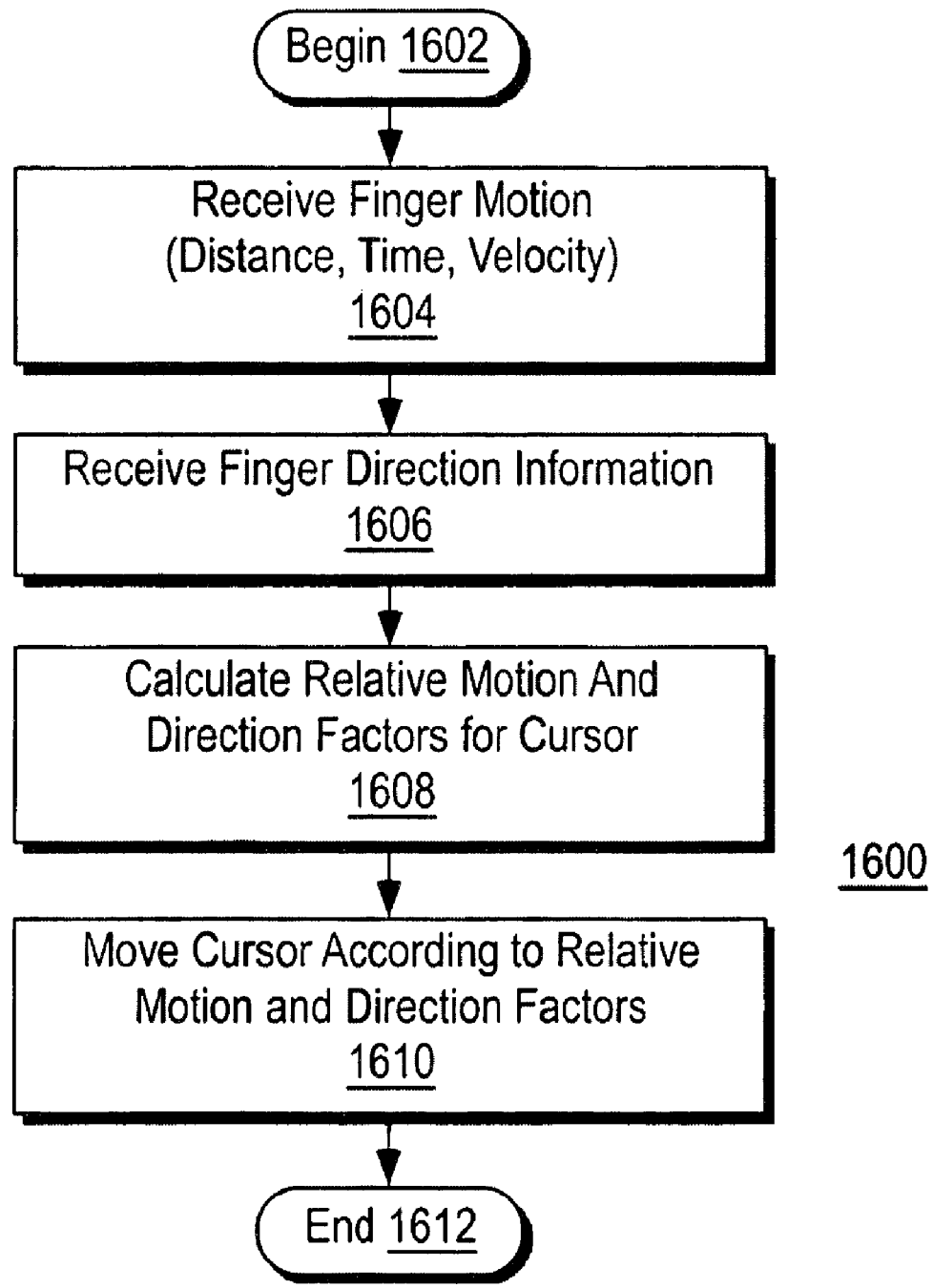
FIG. 16 is a flow diagram showing how the direction of finger movement, obtained from various sensors, may be used to determine finger motion for navigation purposes, and then used to control a device.

Referring to FIG. 16, a flow chart of one embodiment of a navigation sensor operation, specifically the operation of a cursor on a monitor, is illustrated. The process begins in step (1602), and in (1604) finger motion information is received, such as distance, time and velocity. In step (1606), finger direction information is received. In step (1608), relative motion and direction factors are calculated for use in operating the cursor. In step (1610), the cursor is moved according to the relative motion and direction factors calculated in step (1610). The process ends in step (1612).

As previously discussed, the invention may also involve a number of functions to be performed by a computer processor, such as a microprocessor. The microprocessor may be a specialized or dedicated microprocessor that is configured to perform particular tasks by executing machine-readable software code that defines the particular tasks. The microprocessor may also be configured to operate and communicate with other devices such as direct memory access modules, memory storage devices, Internet related hardware, and other devices that relate to the transmission of data in accordance with the invention. The software code may be configured using software formats such as Assembly, Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of computers, such as computer servers, that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, or any commonly used protocol for storing and retrieving information to and from these memory devices respectively.

The apparatus and method include a method and apparatus for enabling and controlling fingerprint sensors and fingerprint image data and motion data in conjunction with the operation of an electronic device where navigation and fingerprint verification processes are utilized. Although this embodiment is described and illustrated in the context of devices, systems and related methods of imaging fingerprints and navigation features for a portable device, the scope of the invention extends to other applications where such functions are useful. Furthermore, while the foregoing description has been with reference to particular embodiments of the invention, it will be appreciated that these are only illustrative of the invention and that changes may be made to those embodiments without departing from the principles of the invention.

What is claimed is:

1. A fingerprint imaging device comprising:
a plurality of partial fingerprint image sensors comprising a first partial fingerprint imager sensor having a sensing area smaller than a fingerprint area to be imaged and at least one additional fingerprint image sensor capable of detecting finger motion in at least one direction;
the at least one additional fingerprint image sensor being disposed along an axis of finger motion in at least one of a first direction and a second direction that is different from the first direction;
the plurality of partial fingerprint image sensors being present on a substrate; and
at least one integrated circuit configured to drive at least one of the plurality of partial fingerprint image sensors being also present on the same substrate separated from each of the plurality of fingerprint image sensors and electrically connected to at least one fingerprint image sensor of the plurality of fingerprint image sensors.

2. The fingerprint imaging device of claim 1, in which the fingerprint imaging device is configured to control a cursor on a display of a computing device.

3. The fingerprint imaging device of claim 1, in which information obtained using at least one of the plurality of partial fingerprint image sensors is used to construct an image of an entire fingerprint.

4. The fingerprint imaging device of claim 1, wherein a first integrated circuit is configured to drive the first partial fingerprint image sensor, the first partial fingerprint image sensor configured to construct a fingerprint image comprising an area of the entire fingerprint larger than the sensing area of the first partial fingerprint image sensor, and a second integrated circuit is configured to drive the at least one additional partial fingerprint image sensor configured to derive finger motion information, and wherein the first integrated circuit has a first input/output port and is separated from and electrically connected to the first partial fingerprint image sensor, and the second integrated circuit has a separate second input/output port and is separated from and electrically connected to the at least one additional partial fingerprint image sensor.

5. The fingerprint imaging device of claim 1 in which the same integrated circuit is configured to drive the first partial fingerprint image sensor and the at least one additional partial fingerprint image sensor and is separated from and electrically connected to each of the first partial fingerprint image sensor and the at least one additional partial fingerprint image sensor.

6. The fingerprint imaging device of claim 1, in which the substrate comprises a flexible thin film substrate.

7. The fingerprint imaging device of claim 6, in which the thin film substrate comprises a dielectric material.

8. The fingerprint imaging device of claim 7, in which the substrate comprises a polyimide film tape.

9. The fingerprint imaging device of claim 1, in which the plurality of partial fingerprint image sensors are mounted on a surface, and in which the surface has a texture feature configured to allow a user to determine the position of at least one of the partial fingerprint image sensors by producing a tactile sensation on the underside of the finger of the user.

10. The fingerprint imaging device of claim 9, in which the texture feature comprises at least one bump on the surface of the fingerprint imaging device, and wherein the at least one bump is disposed to coincide with the position of at least one of the partial fingerprint image sensors on the surface.

11. The fingerprint imaging device of claim 9, in which the texture feature comprises at least one bump on the surface of the fingerprint imaging device, and wherein the at least one bump is disposed to coincide with a center of an area defined by a perimeter that encompasses the at least one partial fingerprint image sensor.

12. The fingerprint imaging device of claim 1, in which the at least one partial fingerprint image sensor comprises a deep finger penetrating radio frequency (RF) based imager.

13. The fingerprint imaging device of claim 1, in which at least one of the first partial fingerprint image sensor and the at least one additional partial fingerprint image sensor each comprise a linear one dimensional sensor array configured to sense features of a fingerprint along an axis, utilizing a plurality of sensing elements configured to capture temporally separated segments of fingerprint image data;
a memory buffer configured to receive and store the segments of fingerprint image data; and
a computing device configured to generate from the segments of fingerprint image data a fingerprint image of the entire fingerprint and fingerprint motion data for use in navigation.

14. The fingerprint imaging device of claim 13, wherein the at least one additional partial fingerprint image sensor comprises a linear one dimensional sensor array configured to sense at least two temporally separated overlapping line segments of fingerprint image data, and wherein the computing device is configured to generate motion data based on at least two sensed temporally separated overlapping line segments of fingerprint image data, to determine motion of the finger.

15. The fingerprint imaging device of claim 13, wherein the at least one additional fingerprint image sensor comprises a linear one dimensional sensor array configured to sense a first set of features of a fingerprint along an axis of finger motion, and to generate a first set of fingerprint image data from the one dimensional linear array of sensors, and is also configured to subsequently sense a second set of features of the fingerprint along the axis of finger motion, and to generate a second set of fingerprint image data from the one dimensional linear array of sensors; and wherein the computing device is configured to compare the first set of fingerprint image data and the second set of fingerprint image data to determine the distance traveled by the finger over a time interval, and to determine from the distance and time interval navigational data for navigating a cursor on a graphical user interface.

16. The fingerprint imaging device of claim 13, in which at least one of the one dimensional linear array of sensors comprises a deep finger penetrating radio frequency (RF) based imager.

17. A fingerprint imaging device comprising:
a plurality of partial fingerprint image sensors each comprising a deep finger penetrating radio frequency (RF) based one dimensional linear array of sensors;
in which respective ones of the plurality of partial fingerprint image sensors are each disposed to detect finger motion in a direction from at least a first direction and a second direction that is different from the first direction; and
in which the respective ones of the plurality of partial fingerprint image sensors are each mounted on a surface that has a texture feature configured to allow a user to determine the position of at least one of the respective ones of the partial fingerprint image sensors by producing a tactile sensation on the underside of a finger of the user.

18. The fingerprint imaging device of claim 17, in which the fingerprint imaging device is configured to control a cursor on a display of a computing device.

19. The fingerprint imaging device of claim 17, in which the computing device is configured to use information obtained from at least one of the partial fingerprint image sensors to construct an image of an entire fingerprint.

20. The fingerprint imaging device of claim 17, in which the plurality of partial fingerprint image sensors comprise individual sensing areas on the same substrate.

21. The fingerprint imaging device of claim 20, in which at least one integrated circuit used to drive at least one of the plurality of partial fingerprint image sensors is present on the same substrate, separated from the respective individual sensing area, and electrically connected to the respective at least one of the plurality of partial fingerprint image sensors.

22. The fingerprint imaging device of claim 21, in which a first integrated circuit is configured to drive a first partial fingerprint image sensor configured to construct an entire fingerprint image, and a second integrated circuit is configured to drive at least one additional partial fingerprint image sensor configured to derive finger motion information, and in which the first integrated circuit has a first input/output port, and the second integrated circuit has a separate second input/output port.

23. The fingerprint imaging device of claim 21 in which the same integrated circuit is configured to drive the first partial fingerprint image sensor and the at least one additional partial fingerprint image sensor, and in which the integrated circuit has a single input/output port for the first partial fingerprint image sensor and the at least one additional partial fingerprint image sensor.

24. The fingerprint imaging device of claim 21, in which the substrate comprises a flexible thin film substrate.

25. The fingerprint imaging device of claim 24, in which the thin film substrate comprises a dielectric material.

26. The fingerprint imaging device of claim 25, in which the thin film substrate comprises a polyimide film tape.

27. The fingerprint imaging device of claim 19, in which the texture feature comprises at least one bump on a surface of the fingerprint imaging device, and wherein the at least one bump is disposed to coincide with the position of at least one of the partial fingerprint image sensors on the surface.

28. The fingerprint imaging device of claim 19, in which the texture feature comprises at least one bump on a surface of the fingerprint imaging device, and wherein the at least one bump is disposed to coincide with a center of an area defined by a perimeter that encompasses at least one of the partial fingerprint image sensors.

29. The fingerprint imaging device of claim 19, wherein the additional linear fingerprint image sensor arrays are each configured to sense at least two temporally separated overlapping line segments of fingerprint image data, and wherein the fingerprint imaging device additionally comprises a computing device configured to generate motion data based on the at least two sensed overlapped line segments of fingerprint data and navigation data based on relative motion of a finger relative to the fingerprint imaging device.

30. The fingerprint imaging device of claim 29, wherein the each of the additional linear fingerprint image sensor arrays is configured to sense a first set of features of a fingerprint along an axis of finger motion and to generate a first set of image data from the linear one dimensional sensor array and is also configured to subsequently sense a second set of features of the fingerprint along the axis of finger motion and to generate a second set of image data from the linear one dimensional sensor array; and
wherein the computing device is configured to compare the first set of image data and the second set of image data to determine a distance traveled by the finger over a time interval, and to calculate finger motion from the distance traveled.

31. A method comprising:
determining a first motion of a finger by comparing digital data from a first partial fingerprint image sensor comprising a first series of fingerprint image features with a subsequently sensed second series of fingerprint image features and determining an amount of shift between the first series of fingerprint image features and the second series of fingerprint image features to determine a distance traveled by a finger along an axis of a first linear one dimensional fingerprint image sensor;
determining a second motion of the finger by comparing digital data from a third partial fingerprint image sensor comprising a third series of fingerprint image features with a subsequently sensed fourth series of fingerprint image features and determining an amount of shift between the third series of fingerprint image features and the fourth series of fingerprint image features to determine a distance traveled by the finger along an axis of a second linear one dimensional fingerprint image sensor; and
using the first motion of the finger and the second motion of the finger to calculate the movement of the finger in two dimensions, in which the finger moves over a surface, and in which the surface has a texture feature configured to allow a user to determine the position of at least one of the first image sensor and the second image sensor by producing a tactile sensation on the underside of the finger of a user.

32. The method of claim 31, further comprising controlling a cursor on a display of a computing device utilizing the first motion and the second motion.

33. The method of claim 31, further comprising using information from a third partial fingerprint image sensor to construct an image of an entire fingerprint.

34. The method of claim 31, in which the texture feature comprises at least one bump disposed on a surface coinciding with a position of at least one partial fingerprint image sensor.

35. The method of claim 34, in which the texture feature comprises at least one bump disposed on the surface coinciding with a center of an area defined by a perimeter encompassing at least one of the partial fingerprint image sensors.

36. The method of claim 31, in which at least one of the partial fingerprint image sensors comprises a deep finger penetrating radio frequency (RF) based imager.

* * * * *